(12) United States Patent
Han et al.

(10) Patent No.: US 10,317,200 B1
(45) Date of Patent: Jun. 11, 2019

(54) MULTI-MODE SENSOR FOR SURFACE ORIENTATION

(71) Applicant: Apple Inc., Cupertino, CA (US)

(72) Inventors: Chin San Han, Mountain View, CA (US); Brian R. Land, Woodside, CA (US)

(73) Assignee: Apple Inc., Cupertino, CA (US)

( * ) Notice: Subject to any disclaimer, the term of this patent is extended or adjusted under 35 U.S.C. 154(b) by 483 days.

(21) Appl. No.: 15/275,032

(22) Filed: Sep. 23, 2016

Related U.S. Application Data

(60) Provisional application No. 62/235,172, filed on Sep. 30, 2015.

(51) Int. Cl.
| | | |
|---|---|---|
| *G01C 3/08* | (2006.01) | |
| *G01B 11/26* | (2006.01) | |
| *G01B 11/06* | (2006.01) | |
| *G06F 3/03* | (2006.01) | |
| *G06F 1/16* | (2006.01) | |
| *G06F 3/041* | (2006.01) | |

(52) U.S. Cl.
CPC ..........  *G01B 11/26* (2013.01); *G01B 11/0608* (2013.01); *G06F 1/163* (2013.01); *G06F 3/0308* (2013.01); *G06F 3/041* (2013.01); *G06F 2200/1637* (2013.01)

(58) Field of Classification Search
CPC ... G01B 11/26; G01B 11/0608; G06F 3/0308; G06F 3/041; G06F 1/163; G06F 2200/1637
USPC ...................................................... 356/4.01
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,083,172 A | 7/2000 | Baker, Jr. et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Non-Final Office Action dated Oct. 25, 2018, for U.S. Appl. No. 15/100,626, filed May 31, 2016, twenty pages.

(Continued)

*Primary Examiner* — Mark Hellner
(74) *Attorney, Agent, or Firm* — Morrison & Foerster LLP

(57) ABSTRACT

The present disclosure relates generally to wearable devices and methods for detecting relative surface orientation. The wearable devices and methods may include a multi-mode sensor comprising emitter-detector combinations (e.g., sets or pairs) that have various spacings between the light emitter and the photodetector. Proximity curves can be generated based upon the various emitter-detector pair spacings, and used to assess surface distance and angular orientation of the wearable device to a body surface of an individual. In some variations, location and/or orientation of the device relative to the body surface is determined based on mapping data acquired by one or more emitter-detector pairs to surface distance (z distance) values based on proximity curve data stored in a memory of a device controller.

20 Claims, 17 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,323,846 B1 | 11/2001 | Westerman et al. |
| 6,615,065 B1 | 9/2003 | Barrett et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,616,110 B2 | 11/2009 | Crump et al. |
| 7,663,607 B2 | 2/2010 | Hotelling et al. |
| 8,378,811 B2 | 2/2013 | Crump et al. |
| 8,479,122 B2 | 7/2013 | Hotelling et al. |
| 8,618,930 B2 | 12/2013 | Papadopoulos et al. |
| 8,792,869 B2 | 7/2014 | Prentice et al. |
| 8,873,026 B2 | 10/2014 | Puig |
| 9,049,998 B2 | 6/2015 | Brumback et al. |
| 9,241,635 B2 | 1/2016 | Yuen et al. |
| 9,314,197 B2 | 4/2016 | Eisen et al. |
| 2002/0029128 A1* | 3/2002 | Jones .................... G01B 21/04 702/152 |
| 2006/0197753 A1 | 9/2006 | Hotelling |
| 2007/0106137 A1 | 5/2007 | Baker, Jr. et al. |
| 2008/0033266 A1 | 2/2008 | Diab et al. |
| 2010/0016696 A1 | 1/2010 | Addison et al. |
| 2010/0217102 A1 | 8/2010 | LeBoeuf et al. |
| 2012/0310062 A1 | 12/2012 | Li et al. |
| 2013/0030267 A1 | 1/2013 | Lisogurski et al. |
| 2013/0237272 A1 | 9/2013 | Prasad |
| 2014/0073968 A1 | 3/2014 | Engelbrecht et al. |
| 2014/0155705 A1 | 6/2014 | Papadopoulos et al. |
| 2015/0025394 A1* | 1/2015 | Hong ................ A61B 5/02427 600/479 |
| 2016/0007925 A1* | 1/2016 | Mirov ............... A61B 5/02427 356/400 |
| 2016/0291145 A1* | 10/2016 | Zeng .................... G01S 13/723 |
| 2016/0296174 A1 | 10/2016 | Isikman et al. |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

| Mode # | 1st Pair | 2nd Pair |
|---|---|---|
| S9 | G1-PD1 | G2-PD2 |
| S10 | G1-PD2 | G2-PD1 |
| S11 | IR1-PD1 | IR2-PD2 |
| S12 | IR1-PD2 | IR2-PD1 |

| Mode # | 1st Pair | 2nd Pair |
|---|---|---|
| S1 | G1-PD1 | G1-PD2 |
| S2 | G2-PD1 | G2-PD2 |
| S3 | IR1-PD1 | IR1-PD2 |
| S4 | IR2-PD1 | IR2-PD2 |
| S5 | G1-PD1 | G2-PD1 |
| S6 | G1-PD2 | G2-PD2 |
| S7 | IR1-PD1 | IR2-PD1 |
| S8 | IR1-PD2 | IR2-PD2 |

FIG. 4E

| Pair # | Emitter | Detector |
|---|---|---|
| 1 | G1 | PD1 |
| 2 | G1 | PD2 |
| 3 | G2 | PD1 |
| 4 | G2 | PD2 |
| 5 | IR1 | PD1 |
| 6 | IR1 | PD2 |
| 7 | IR2 | PD1 |
| 8 | IR2 | PD2 |

FIG. 4D

| Mode # | 1st Pair | 2nd Pair |
|---|---|---|
| M1 | G1-PD1 | IR1-PD2 |
| M2 | G1-PD1 | IR2-PD2 |
| M3 | G2-PD1 | IR1-PD2 |
| M4 | G2-PD1 | IR2-PD2 |
| M5 | G1-PD2 | IR1-PD1 |
| M6 | G1-PD2 | IR2-PD1 |
| M7 | G2-PD2 | IR1-PD1 |
| M8 | G2-PD2 | IR2-PD1 |

| Mode # | 1st Pair | 2nd Pair |
|---|---|---|
| M9 | G1-PD1 | IR1-PD1 |
| M10 | G1-PD2 | IR1-PD2 |
| M11 | G2-PD1 | IR2-PD1 |
| M12 | G2-PD2 | IR2-PD2 |
| M13 | G1-PD1 | IR2-PD1 |
| M14 | G1-PD2 | IR2-PD2 |
| M15 | G2-PD1 | IR1-PD1 |
| M16 | G2-PD2 | IR1-PD2 |

FIG. 4F

| Mode # | 1st Pair | 2nd Pair |
|---|---|---|
| E1 | G1-PD1 | G2-PD1 |
| E2 | G1-PD2 | G2-PD2 |
| E3 | IR1-PD1 | IR2-PD1 |
| E4 | IR1-PD2 | IR2-PD2 |
| E5 | G1-PD1 | IR1-PD2 |
| E6 | G1-PD1 | IR2-PD2 |
| E7 | G2-PD1 | IR1-PD2 |
| E8 | G2-PD1 | IR2-PD2 |

FIG. 4G

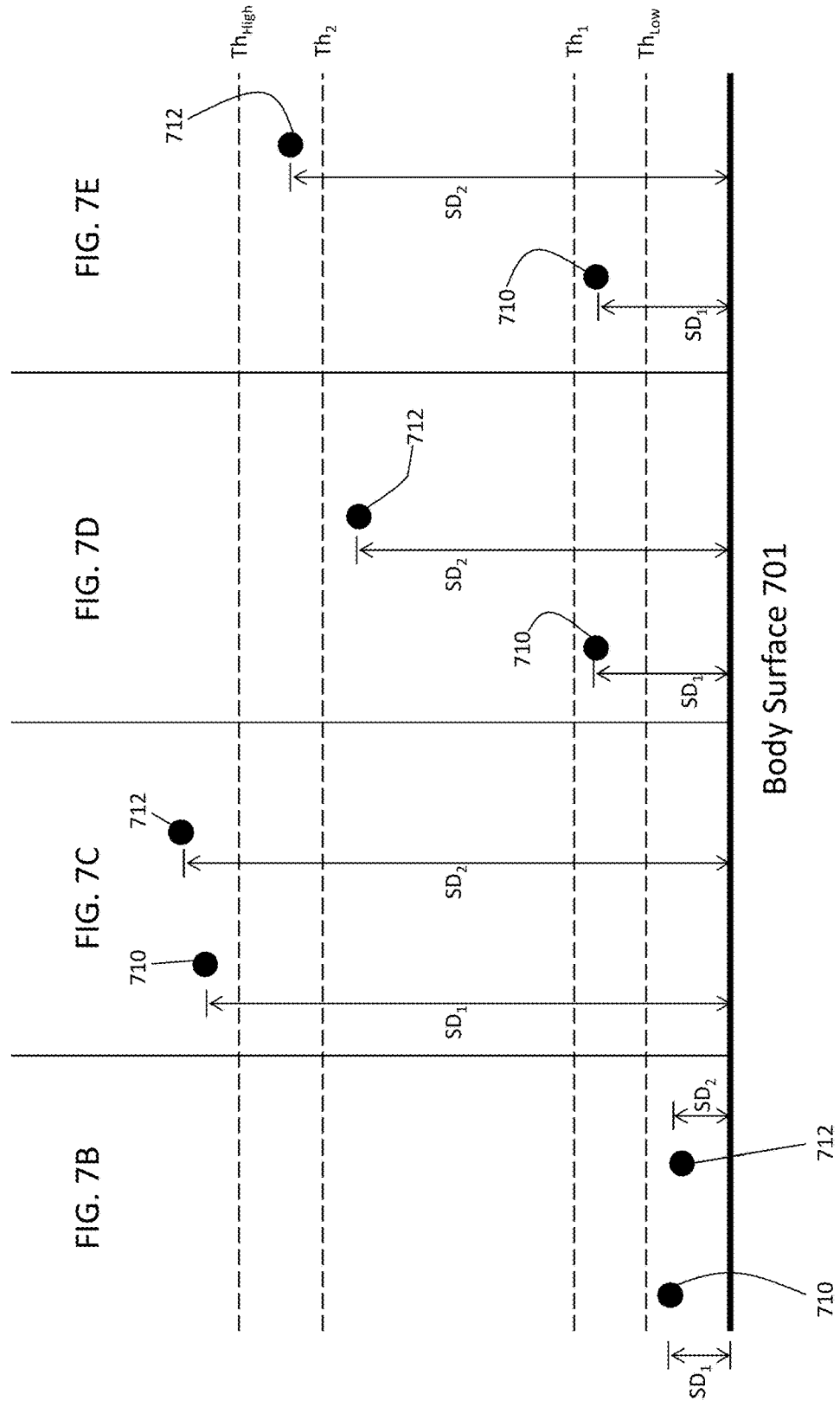

Body Surface 701

MULTI-MODE SENSOR FOR SURFACE ORIENTATION

CROSS-REFERENCE TO RELATED APPLICATIONS

This application claims priority to U.S. Provisional Patent Application Ser. No. 62/235,172, filed Sep. 30, 2015, which is hereby incorporated by reference in its entirety.

FIELD

This relates generally to electronic devices capable of and methods for detecting relative surface orientation of the device to a body surface of the user.

BACKGROUND

Proximity sensors are capable of detecting the presence of a target without physical contact. They generally emit electromagnetic radiation, measure the return signal, and identify the location of the target based on the profile of the return signal. Proximity sensors are commonly used on mobile devices such as smartphones to detect accidental touchscreen taps when held to the ear during a call. Portable devices such as wristwatches may also include a proximity sensor that detects whether the watch is "off wrist" and should be turned to a locked state. However, for those users who prefer to wear their watch loosely against their wrist, such a proximity sensor may cause unintentional locking of the watch, or other consequences.

Accordingly, it may be beneficial to develop alternate methods or devices to more accurately determine the location of a wearable device relative to the user.

SUMMARY

Disclosed herein are wearable devices and methods for detecting relative surface orientation of the devices to a body surface of the user. The wearable devices and methods may include a multi-mode sensor including light emitters and photodetectors that are configured to generate multiple light paths across one or more light wavelengths. Computing or deriving location and/or orientation information using data acquired from a plurality of different light paths (and/or across one or more different light wavelengths) may help facilitate a more robust and precise location measurement when an individual is wearing the device loosely and/or when the optical qualities of the body surface are not uniform or consistent. For example, the body surface region that contacts the device may be pigmented such that certain wavelengths of light may not provide precise or accurate location/orientation measurements. In such cases, interrogating the body surface using a plurality of different wavelengths, and/or acquiring light data across multiple emitter-detector pairs located across various regions of the body surface, may help to determine the location of the device with respect to that pigmented region, even if that region may not be directly interrogated by a particular emitter-detector pair (or such data cannot be acquired with a reasonable level of confidence).

More generally, a multi-mode sensor may comprise an array of light emitters and an array of photodetectors, where individual emitters and photodetectors may be paired in various ways to form a plurality of emitter-detector pairs or sets. A controller may have a plurality of modes, where the pairing between the emitters and photodetectors of these arrays may vary in order to collect location data across a variety of different light paths. Multi-mode measurements of light data may help facilitate the computation of the location and/or orientation of the device relative to the body surface. Relative orientation information may include surface distance (z distance) data and/or tilt angle (e.g., roll angle, pitch angle) data, or a combination thereof. Location or orientation information may be used by the controller to determine whether the wearable device is worn by the individual or removed from the individual. In some variations, orientation information may be used by the controller to determine whether the wearable device is worn loosely on the body surface, or removed from the body surface.

In another variation, a light emitter and its corresponding photodetector form an emitter-detector pair having a separation distance that can be considered a "mode" by which the multi-mode sensor can operate to obtain proximity or location information. Another light emitter-detector pair having a different separation distance can be considered another "mode" by which the multi-mode sensor can operate to obtain proximity information. In some variations, proximity information can be used to generate proximity curves or tables that may then be stored in a controller memory, and later recalled to assess surface distance and angular orientation of the wearable device to the body surface of the user.

The wearable devices generally comprise a housing; and a multi-mode sensor within the housing that comprises a plurality of emitter-detector pairs configured to generate a plurality of light paths, where each of the plurality of emitter-detector pairs comprises a light emitter and a corresponding photodetector, and where the light emitter and the corresponding photodetector have a separation distance. The wearable devices may include a processor or controller within the housing configured to run an algorithm for generating a proximity value relating to relative surface orientation of the housing to a body surface of an individual using information from at least two of the emitter-detector pairs. The information used by the algorithm may include proximity curve data for the at least two the emitter-detector pairs, and the proximity curve data may be based upon information obtained from the plurality of light paths, e.g., the path length of the light that travels between a light emitter and photodetector of an emitter-detector pair. The generated proximity value may correspond to a surface distance (z distance), a tilt value, or a combination thereof, between the wearable device and the body surface.

The multi-mode sensor may include a single light emitter or a plurality of light emitters. Separation distances between each light emitter and its corresponding photodetector may be the same or different. The length of the light paths generated by the plurality of emitter-detector pairs may vary with the separation distance of light emitter and the corresponding photodetector of the emitter-detector pairs.

The wearable devices may comprise a wristwatch. Here a multi-mode proximity sensor may be configured to detect relative surface orientation of the wristwatch to a wrist surface of the user. Based upon the detected relative surface orientation, the wristwatch can be sensed to be, e.g., "off wrist," and turned to a locked or low power state.

Methods for detecting relative surface orientation of a wearable device to a body surface of a user are further disclosed herein. The methods generally include the steps of: a) attaching the wearable device to the body surface, the wearable device comprising a housing; and a multi-mode sensor within the housing and comprising a plurality of emitter-detector pairs configured to generate a plurality of light paths, where each of the plurality of emitter-detector pairs comprises a light emitter and a corresponding photodetector, and where the light emitter and corresponding photodetector have a separation distance; and a processor within the housing; and b) generating a proximity value relating to relative surface orientation of the housing to a body surface of an individual using an algorithm run by the processor, where the algorithm uses information from at least two of the emitter-detector pairs. The information used by the algorithm may include proximity curve data for at least two of the emitter-detector pairs, and the proximity curve data may be based upon information obtained from the plurality of light paths, e.g., the path length of the light that travels between a light emitter and photodetector of an emitter-detector pair. The generated proximity value may correspond to a surface distance (z distance), a tilt value, or a combination thereof, between the wearable device and the body surface.

When generating proximity curve data, a body surface may be illuminated with a plurality of wavelengths of light. As further described below, a differential or comparative measurement in the proximity curve response for each emitter-detector pair illuminated with different wavelengths of light can be used to determine relative surface orientation. The proximity curve data may correspond to a surface distance (z distance) and/or angular orientation between the wearable device and the body surface. Data from at least two proximity curves are typically compared when detecting relative surface orientation. In some instances, proximity curve data for at least three emitter-detector pairs may be compared, proximity curve data for at least four emitter-detector pairs may be compared, or proximity curve data for at least five emitter-detector pairs may be compared.

Depending on the relative surface orientation of the wearable device, the device may be turned to a locked state. For example, if the detected relative surface orientation of a wristwatch determines that the watch is "off wrist," then the watch may be turned to a locked or low power state.

In one variation, a multi-mode sensor may comprise a first light emitter that emits light of a first wavelength, a second light emitter that emits light of a second wavelength, and a first photodetector, where the first light emitter and the first photodetector form a first emitter-detector pair and the second light emitter and the first photodetector form a second emitter-detector pair. The light data from the emitter-detector pairs may be used to compute or derive a surface distance (z distance) from the wearable device to the body surface of an individual. The first wavelength and second wavelengths may be the same, or may be different. The first and second emitter-detector pairs may be activated sequentially to acquire light data that may be used to determine the relative location between the device and the body surface. In other variations where the photodetector is capable of simultaneously detecting two wavelengths of light in two separate channels and the first wavelength is different from the second wavelength, the first and second emitter-detector pairs may be activated at the same time such that light data is acquired simultaneously. Alternatively or additionally, a multi-mode sensor may comprise a first light emitter that emits light of a first wavelength, a second light emitter that emits light of a second wavelength, a first photodetector and a second photodetector, where the first light emitter and the first photodetector form a first emitter-detector pair and the second light emitter and the second photodetector from a second emitter-detector pair. In variations where the first and second wavelengths are the same, the emitter-detector pairs may be activated sequentially to interrogate the relative location between the device and the body surface. In variations where the first and second wavelengths are different, the emitter-detector pairs may be activated simultaneously. Another multi-mode sensor may comprise a light emitter, a first photodetector and a second photodetector, where the light emitter and the first photodetector may form a first emitter-detector pair and the light emitter and the second photodetector may form a second emitter-detector pair. Light data may be acquired from both emitter-detector pairs simultaneously. In some variations, the separation distance between the emitter and the first photodetector of the first emitter-detector pair may be different from the separation distance between the emitter and the second photodetector of the second emitter-detector pair.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

DESCRIPTION OF THE FIGURES

For a better understanding of the various described embodiments, reference should be made to the Detailed Description below, in conjunction with the following drawings in which like reference numerals refer to corresponding parts throughout the figures.

FIG. 4D is a table that represents possible emitter-detector pairings of the wrist-worn device of FIG. 4A.

FIG. 4E is a table that summarizes various modes comprising sets of emitter-detector pairings of the wrist-worn device of FIG. 4A that use a single wavelength of light to interrogate the body surface.

FIG. 4F is a table that summarizes various modes comprising sets of emitter-detector pairings of the wrist-worn device of FIG. 4A that use two wavelengths of light to interrogate the body surface.

FIG. 4G is a table that summarizes a group of modes comprising a pair of emitter-detector pairings that may implemented in the wrist-worn device of FIG. 4A.

FIGS. 7B-7E schematically depict one variation of a method using separation distance data between the wrist-worn device and the body surface to determine whether the wrist-worn device is worn by an individual.

DETAILED DESCRIPTION

Figure 1A:
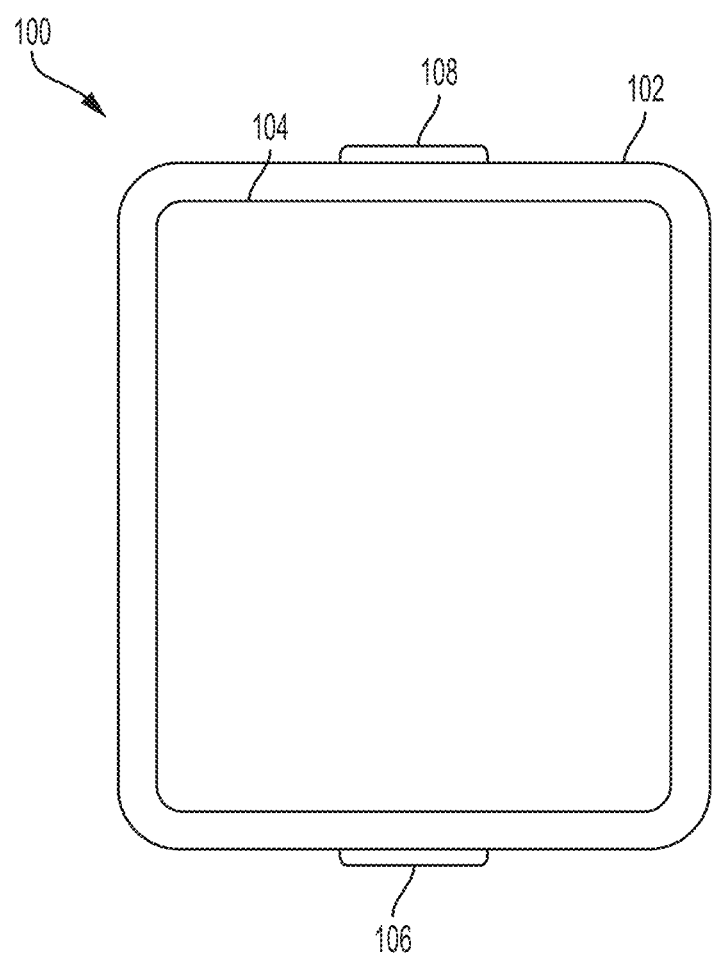
FIG. 1A depicts an exemplary wearable device.

The following description sets forth exemplary wearable devices and methods for determining relative surface orientation of the device to a body surface of the user. It should be recognized, however, that such description is not intended as a limitation on the scope of the present disclosure but is instead provided as a description of exemplary embodiments.

The wearable devices described herein are capable of determining relative surface orientation to a body surface by employing a multi-mode sensor having multiple sensor parameters (or modes) that can be manipulated to generate various proximity responses (i.e., proximity curves). In some variations, multiple modes can be based on the various separation distances between the light emitters and their corresponding photodetectors in the multi-mode sensor and/or their location in space, e.g., in a plane of the wearable device. Modes may also be based on the timing of the activation of one or more emitters and the acquisition of light data by one or more emitters. The light paths created by the light emitters and their corresponding photodetectors (emitter-detector pairs) may have different lengths upon which proximity curve data can be generated, and a resultant proximity value, e.g., surface distance and/or angular orientation of the wearable device to a body surface, obtained. Additionally or alternatively, the illumination wavelength of the light emitter can be a sensor parameter upon which to base the proximity curves. In some instances, the emission and viewing angles of the light emitter and the photodetector can be used as a sensor parameter. The various modes may be employed to detect the distance to a target surface, e.g., the wrist surface, by direct methods (e.g., direct measurement of the proximity response of a single emitter-detector pair and correlating the response to distance), by a differential or comparative measurement (e.g., by using the differences in response of each emitter-detector pair to enable a more accurate determination of relative surface distance), or by a combination of direct, differential, and comparative measurements.

One or more emitters and one or more detectors may be combined together in various ways to form an emitter-detector set. A set may comprise at least one emitter that corresponds to at least one detector. An emitter-detector pair is an emitter-detector set with exactly one emitter and exactly one detector. Some variations of emitter-detector sets may comprise two or more emitters that correspond with one or more detectors (e.g., a single detector that receives a light signal from two emitters), while other variations of emitter-detector sets may comprise one or more emitters that correspond with two or more detectors (e.g., light from one emitter is detected by two detectors). As described herein, a particular emitter may be the emitter of a plurality of emitter-detector pairs or sets, and a particular detector may be the detector of a plurality of emitter-detector pairs or sets. That is, two different emitter-detector pairs or sets may have the same emitter (but different detector(s)), or the same detector (but different emitters). The emitter(s) and detector(s) of a particular emitter-detector combination, set, or pair may be separately and independently controlled or activated, and may be re-combined with other emitter(s) and detector(s) to form a different emitter-detector combination, set or pair. The light from an emitter (e.g., emitter light that has interacted with a body surface) may be detected by any number of detectors, and similarly, a detector may sense light from any number of emitters.

The wearable devices may be any electronic device suitable for contact with a user's skin, e.g., a phone, wristwatch, arm or wristband, headband, or any device where detection of relative surface orientation may be useful. The wearable device may be worn on a wrist, ankle, head, chest, leg, etc., with the use of a band that is flexible and capable of adjustably fitting a user. For example, the band may be made from a flexible material or have a structure that allows it to have an adjustable circumference. In one variation, the wearable device is a wristwatch.

In general, the wearable devices comprise a housing having an upper surface and a back surface. The housing may comprise a multi-mode sensor that includes one or more light emitters and one or more photodetectors. The one or more light emitters and the one or more photodetectors may form a plurality of emitter-detector pairs, where each of the plurality of emitter-detector pairs has a separation distance between the one or more light emitters and its corresponding photodetector. Additionally, the wearable devices may include a processor within the housing configured to run an algorithm for generating a proximity curve data for each of the plurality of emitter-detector pairs using information obtained from the multi-mode sensor, and for obtaining a proximity value related to surface distance and/or angular orientation of the housing to a body surface of an individual.

The housing of the wearable devices may be configured to have any size and shape suitable for the body area of contact, and may include a housing comprising an upper surface, a back surface, and side surfaces, an interior enclosed within the surfaces, and a display that is mounted in the upper surface of the housing. The display may, for example, be a touch screen or may be a display that is not touch sensitive. The display may include image pixels formed from light-emitting diodes (LEDs), organic LEDs (OLEDs), plasma cells, electrowetting pixels, electrophoretic pixels, liquid crystal display (LCD) components, or other suitable image pixel structures.

In some variations, the wearable device is a device where operation of a predefined set of functions on the device is performed exclusively through a touch screen. By using a touch screen as the primary input control device for operation, the number of physical input control devices (such as push buttons, dials, and the like) on the wearable device may be reduced. The predefined set of functions that are performed exclusively through a touch screen optionally include navigation between user interfaces. In one variation, the touchpad, when touched by the user, navigates the wearable device to a main, home, or root menu from any user interface/mode that is displayed on device. In such variations, a "menu button" is implemented using a touch screen.

The display may include icons or other graphics that indicate various operating modes selectable by the user. A graphics module included in the housing may employ various known software components for rendering and displaying graphics on the touch screen or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like. In some variations, the graphics module stores data representing graphics to be used. Each graphic is, optionally, assigned a corresponding code. Here the graphics module receives, from applications etc., one or more codes specifying graphics to be displayed along with, if necessary, coordinate data and other graphic property data, and then generates screen image data to output to a display controller.

The housing, which may sometimes be referred to as a case, may be formed of plastic, glass, ceramics, fiber composites, metal (e.g., stainless steel, aluminum, etc.), other suitable materials, or a combination of these materials. In some variations, the housing or parts thereof may be formed from dielectric or other low-conductivity material. In other variations, the housing or at least some of the structures that make up the housing may be formed from metal elements.

A display cover layer such as a layer of cover glass or a transparent plastic layer may cover the surface of the display. The display cover layer may have one or more openings. Windows may be provided in the display cover layer to allow light to pass through the display cover layer in connection with the operation of a light sensor, camera, or other optical component.

Referring to FIG. 1A, an exemplary wearable device (100) is shown. In brief, device (100) includes a housing (102) and touch-sensitive display screen (104), hereafter touch screen (104). Alternatively, or in addition to touch screen (104), device (100) has a display and a touch-sensitive surface. Touch screen (104) (or the touch-sensitive surface) may have one or more intensity sensors for detecting intensity of contacts (e.g., touches) being applied. The one or more intensity sensors of touch screen (104) (or the touch-sensitive surface) can provide output data that represents the intensity of touches. The user interface of device (100) can respond to touches based on their intensity, meaning that touches of different intensities can invoke different user interface operations on device (100).

In some variations, device (100) has one or more input mechanisms (106) and (108). Input mechanisms (106) and (108), if included, can be physical. Examples of physical input mechanisms include push buttons and rotatable mechanisms. Device (100) may have one or more attachment mechanisms. Such attachment mechanisms, if included, can be, for example, armbands, headbands, watch straps, belts, and so forth. These attachment mechanisms may permit device (100) to be worn by a user. Exemplary attachment mechanisms include without limitation, bands that may be secured to the user through the use of hooks and loops (e.g., Velcro), a clasp, and/or a band having memory of its shape, e.g., through the use of a spring metal band.

Figure 1B:
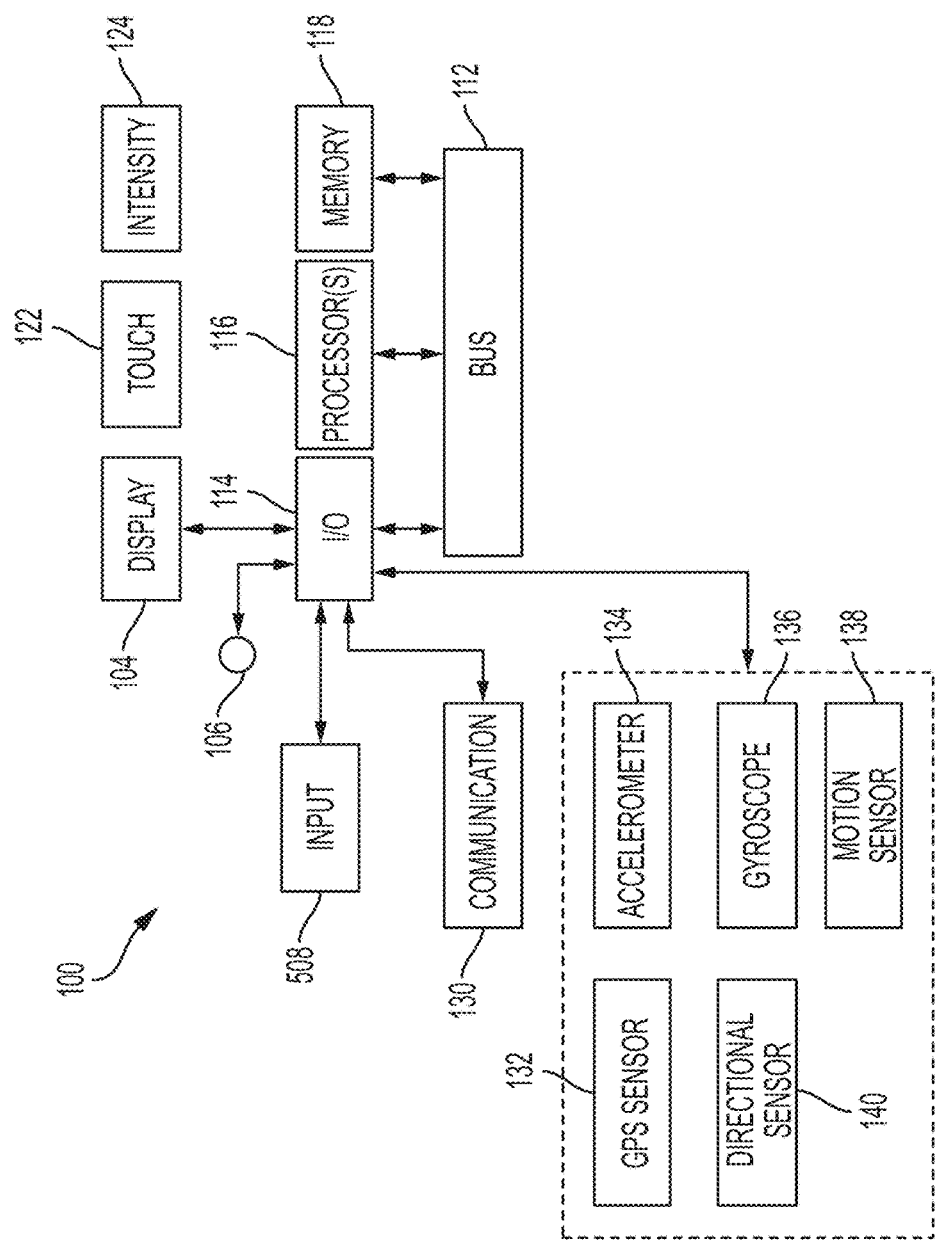
FIG. 1B is a block diagram showing the components of the wearable device in FIG. 1A.

FIG. 1B provides further details on the components of wearable device (100). Here device (100) has bus (112) that operatively couples I/O section (114) with one or more computer processors (116) and memory (118). I/O section (114) can be connected to display (104), which can have touch-sensitive component (122) and, optionally, touch-intensity sensitive component (124). In addition, I/O section (114) can be connected with communication unit (130) for receiving application and operating system data, using Wi-Fi, Bluetooth, near field communication (NFC), cellular, and/or other wireless communication techniques. Device (100) can include input mechanisms (106) and/or (108). Input mechanism (106) may be a rotatable input device or a depressible and rotatable input device, for example. Input mechanism (108) may be a button, in some examples.

In addition to a multi-mode sensor, the wearable device (100) can include other sensors, such as GPS sensor (132), accelerometer (134), directional sensor (140) (e.g., compass), gyroscope (136), and motion sensor (138), all of which can be operatively connected to I/O section (114).

Memory (118) of wearable device (100) can be a non-transitory computer-readable storage medium, for storing computer-executable instructions, which, when executed by one or more computer processors (116), for example, can cause the computer processors to perform the algorithms for generating the proximity curves and determining relative surface orientation. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. A processor (not shown) may be included in the housing that is configured to run various algorithms based on information obtained from the multi-mode sensor. It is understood that wearable device (100) is not limited to the components and configuration of FIGS. 1A and 1B, but can include other or additional components in multiple configurations.

The multi-mode sensor may be provided in any suitable location on the wearable device. In one variation, the housing comprises the multi-mode sensor. For example, the back surface of the housing may comprise the multi-mode sensor.

In basic form, the multi-mode sensor comprises one or more light sources or light emitters for illumination of a body surface, and one or more light detectors (photodetectors) to receive the light that is reflected from the body surface. Exemplary light emitters include without limitation, light emitting diodes (LEDs), incandescent lights, and fluorescent lights. The LED may be a green LED, red LED, or an infrared (IR) LED. When more than one light emitter is used, the plurality can include the same or different light emitters (with different emission/illumination wavelengths).

For example, a combination of one or more green LEDs and IR LEDs may be used. In some variations, the light emitting diodes emit light with a peak spectral response between about 400 and 600 nm. Alternatively or additionally, light emitters may comprise optical fibers that channel light from a light source within the housing to a body-contacting surface of the housing. For example, a wearable device may comprise a housing, a light source located within the housing away from a body-contacting surface of the housing, and a light emitter comprising an optical fiber where light from the light source is captured by a proximal end of the fiber and transmitted to the distal end of the fiber, where the distal end of the fiber terminates at the body-contacting surface of the housing.

The light emitters and photodetectors can be arranged in any suitable configuration in the multi-mode sensor that allows proximity data to be obtained. In one variation, the multi-mode sensor comprises a single light emitter and a plurality of photodetectors. In another variation, the multi-mode sensor comprises a plurality of light emitters and a single photodetector. Some variations of the multi-mode sensor may include a plurality of light emitters and a plurality of photodetectors. In some variations, a photodetector may be able to detect light of different wavelengths and maintain the different wavelength light data as separate channels, while in other variations, the photodetector has one channel that is a summation of all of light data from incident light of one or more wavelengths.

Figure 2A:
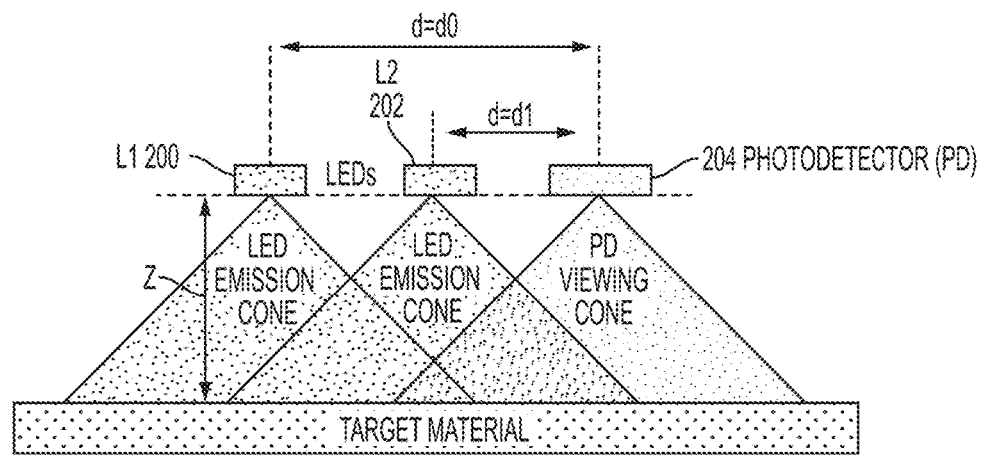
FIG. 2A depicts exemplary emitter-detector pairs of a multi-mode sensor.

Emitter-detector sets or combinations can be formed by pairing/combining the one or more light emitters with a corresponding photodetector. In some variations, a single light emitter is combined with a plurality of photodetectors to form a plurality of emitter-detector pairs (e.g., if there are n detectors, n emitter-detector combinations or pairs may be formed). In other variations, a plurality of light emitters is combined with a single photodetector to form emitter-detector pairs (e.g., if there are m emitters, m emitter-detector combinations or pairs may be formed). For example, as shown in FIG. 2A, two LEDs (L1 (200) and L2 (202)) are combined with a single photodetector (PD) (204) to form two emitter-detector pairs, L1-PD and L2-PD. In yet further variations, a plurality of light emitters are combined with a plurality of photodetectors to form various emitter-detector pairs. For certain wearable devices, it may be useful to form a variety of emitter-detector pairs by combining four light emitters (which may emit one or more wavelengths of light) and two photodetectors. Depending on the relative locations of the emitter-detector pairs, and/or the separation distance between the emitter and the photodetector of each pair, and/or the wavelengths of light emitted by each of the emitters, emitter-detector pairs may interrogate the body surface simultaneously (i.e., more than one emitter-detector pair is activated at the same time) or sequentially (i.e., emitter-detector pairs are activated one-at-a-time, where a first pair is deactivated before a second pair is activated).

Each emitter-detector pair has a separation distance between the light emitter and its corresponding photodetector. When a plurality of emitter-detector pairs is employed, the separation distance for each pair can create different path lengths of light. This may be the case when the target surface (i.e., the surface for determining relative orientation to) has optical properties that are wavelength-independent. Thus, in some variations the sensor parameter or mode upon which the proximity curves are based is the emitter-detector separation distance and the path length of light resulting from the separation distance. The generated proximity curves may be correlated to the distance to a target surface (surface distance or z distance). Direct, differential, and/or comparative processing of the proximity curves may enable a more robust determination of relative surface distance and orientation). Given that multiple emitter-detector pairs may be employed in the multi-mode sensor, in some instances it may be desirable to modulate the sensor output using one or more multiplexers so that information from different emitter-detector pairs can be selected for output and further processing. In some variations, the output is demodulated, e.g., based on intensity, frequency, etc. of the light used for illumination.

Figure 2B:
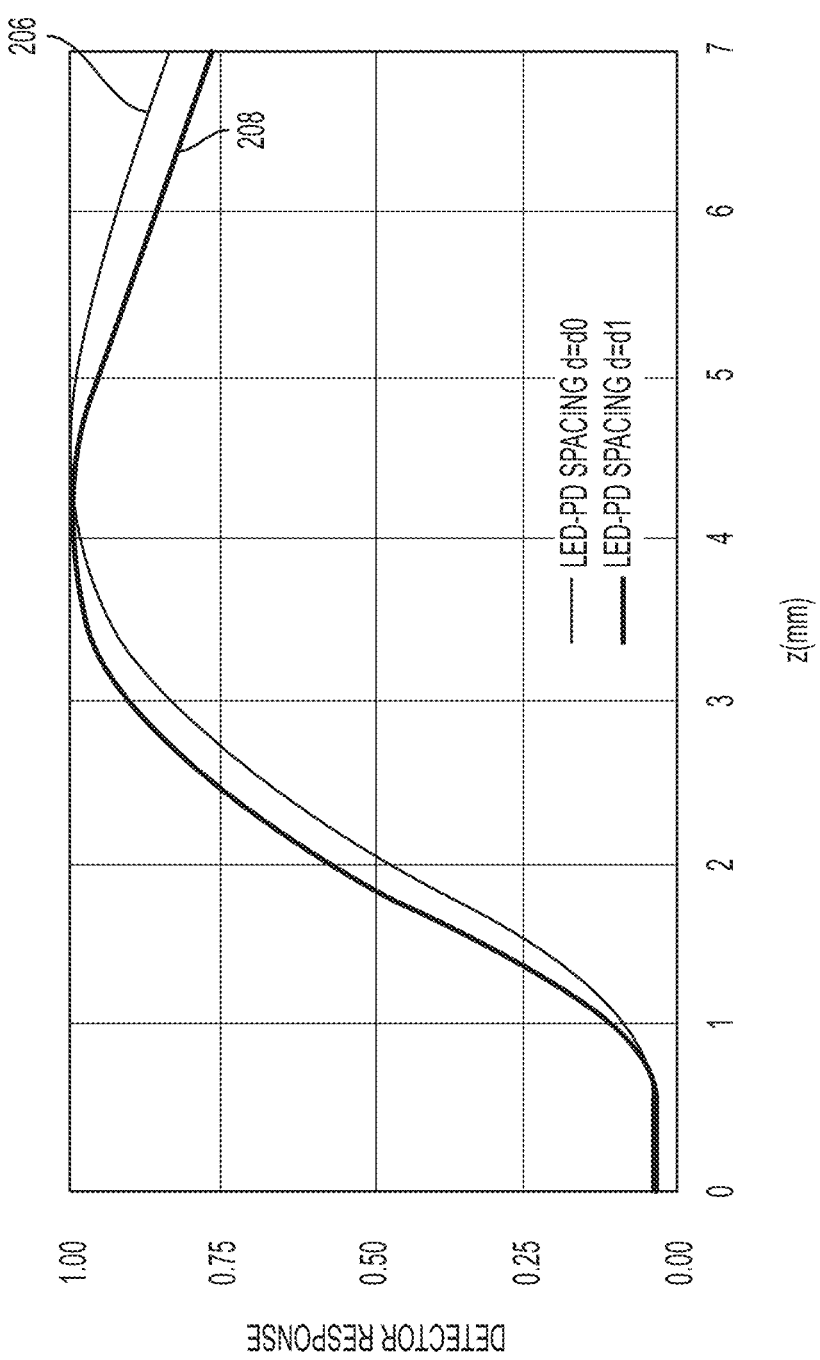
FIG. 2B depicts the proximity response curves generated by the emitter-detector pairs shown in FIG. 2A.

For example, referring to FIG. 2A, the separation distance (d) for emitter-detector pairs L1-PD and L2-PD are d0 and d1, respectively. The response of the multi-mode sensor photodetector (detector response) to the target material, e.g., the body surface of a user, having this different emitter-detector pair spacing is illustrated in FIG. 2B, where proximity curve (206) is provided for emitter-detector pair L1-PD, and proximity curve (208) is provided for emitter-detector pair L2-PD. The generated proximity curves are a function of the distance to the target surface (surface distance or z distance), as previously stated. Proximity curve data may be generated before or during the manufacture of the device, and stored within a memory of the device controller. For example, for every possible or desired set/combination/pairing between the plurality of emitters and plurality of photodetectors in a multi-mode sensor, proximity curve data that represents light intensity as a function of surface distance or z distance may be generated and stored in the controller memory. This proximity curve data may be stored in the form of a plot and/or table, where the plot and/or table may be indexed by emitter-detector pair (i.e., each emitter-detector pair may have its own proximity curve data), and may map a measured light intensity at the photodetector of a particular emitter-detector pair or set with a surface distance or z distance. One or more surface distance data points from one more emitter-detector pairs may be used to generate a plane that approximates the body surface of the individual. For example, a controller may generate a plane that approximates a body surface by using the predetermined/known position of the emitter relative to a corresponding detector and the separation distance as indicated by the corresponding proximity curve to identify coordinates for a point on the body surface in three-dimensional space. Once three points on the body surface have been identified from three emitter-detector pairs or sets, the controller may derive an equation for a plane defined by these three data points. In some variations, triangulation methods may be used to combine surface distance or z distance data from one or more emitter-detector pairs, and/or separation distance between the detectors and emitters of the one or more emitter-detector pairs to derive a plane that approximates a body surface.

The emitter-detector separation distance may range from about 1 mm to about 10 mm, from about 2 mm to about 8 mm, or from about 3 mm to about 7 mm. For example, the emitter-detector separation distance may be about 1 mm, about 2 mm, about 3 mm, about 4 mm, about 5 mm, about 6 mm, about 7 mm, about 8 mm, about 9 mm, or about 10 mm. However, it is understood that any separation distance may be used that generates suitable proximity curve data for detecting relative surface orientation.

In some instances, e.g., when the target surface has wavelength dependent properties, illumination wavelength may be used as another or further sensor parameter or mode upon which to base the proximity curves. That is, illumination with one or more different wavelengths of light may be used alone or in addition to separation distance to generate varying proximity responses. Any suitable wavelength of light may be used, for example, including, but not limited to, infrared, red, green, blue, ultraviolet light, etc.

Figure 3A:
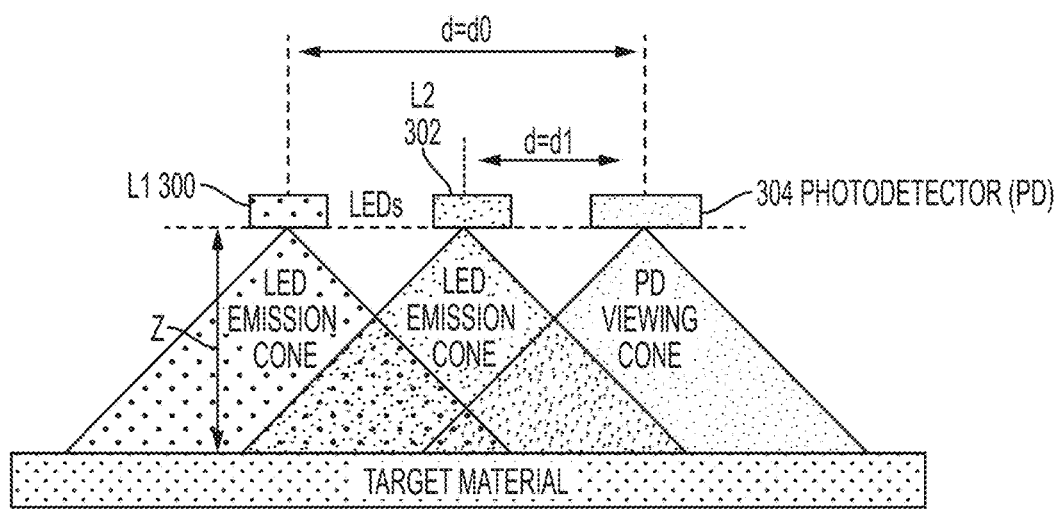
FIG. 3A depicts emitter-detector pairs of a multi-mode sensor according to another variation.
Figure 3B:
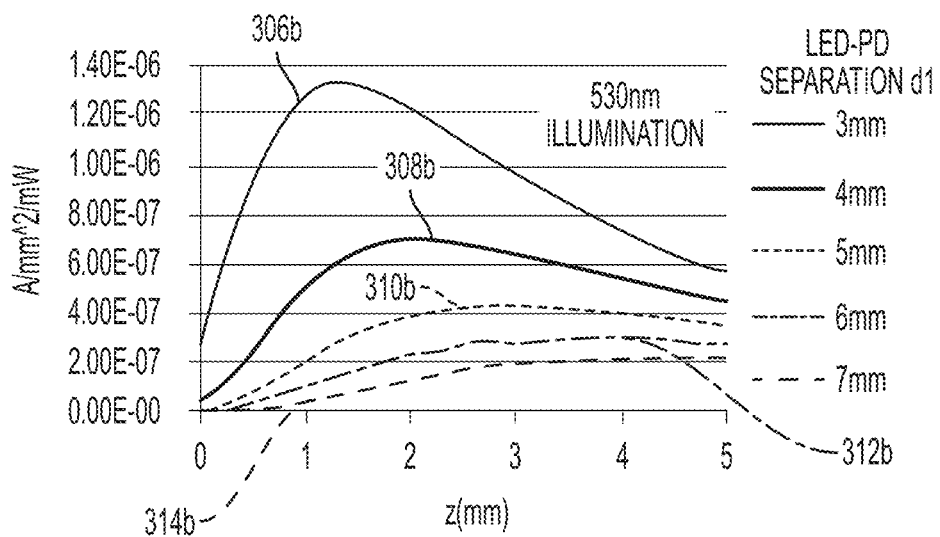
FIG. 3B depicts the proximity response curves generated by the emitter-detector pairs shown in FIG. 3A when illumination is provided at 530 nm (top graph) and 940 nm (bottom graph).
Figure 3B:
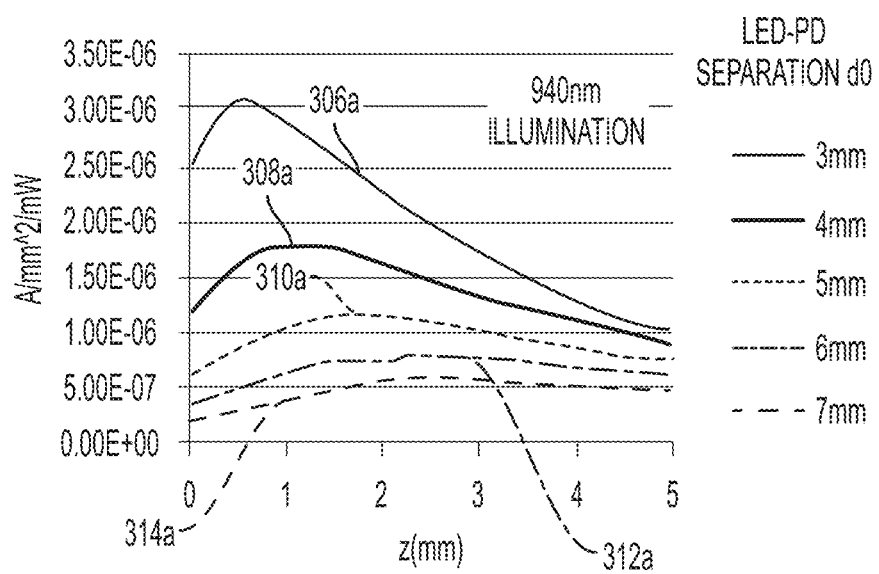

To illustrate, FIG. 3A shows a multi-mode sensor including two light emitters (L1 (300) and L2 (302)) and one photodetector (PD) (304). L1 (300) emits light at 940 nm and L2 emits light at 530 nm. The separation distance (d) for emitter-detector pair L1-PD, indicated as d0, may be varied at 3 mm, 4 mm, 5 mm, 6 mm, or 7 mm. Similarly, the separation distance (d) for emitter-detector pair L2-PD, indicated as d1, may also be varied at 3 mm, 4 mm, 5 mm, 6 mm, or 7 mm. When a target surface is illuminated with light having a wavelength of 940 nm, different proximity curve responses can be generated based on varying L1-PD separation distances, as shown in the bottom graph of FIG. 3B, where proximity curve (306a) indicates the response at 3 mm of separation, proximity curve (308a) indicates the response at 4 mm of separation, proximity curve (310a) indicates the response at 5 mm of separation, proximity curve (312a) indicates the response at 6 mm of separation, and proximity curve (314a) indicates the response at 7 mm of separation. When the same target surface is illuminated with light having a wavelength of 530 nm, as provided in the top graph of FIG. 3B, the responses at the same separation distances are shown to be different, as illustrated by proximity curve (306b) generated at 3 mm of separation, proximity curve (308b) generated at 4 mm of separation, proximity curve (310b) generated at 5 mm of separation, proximity curve (312b) generated at 6 mm of separation, and proximity curve (314b) generated at 7 mm of separation. The generated proximity curves correlate to the distance to a target surface (surface distance or z distance). Similar proximity curves may be generated for emitter-detector pairs or sets where the emitter outputs infrared light (or any other desirable wavelength light). In some variations, the proximity curve for a green emitter-detector pair may be different from the proximity curve for an infrared emitter-detector pair (assuming the same separation distance) due to differing spectral reflectance or absorbance qualities of a body surface.

The distance and/or orientation of a wearable device with respect to a body surface may be determined by interrogating the body surface using a plurality of emitter-detector pairs or sets, determining a proximity value (which may include a surface distance or z distance) for each emitter-detector pair based on previously generated proximity curve data (which may be in the form of a plot or a table), and generating a body surface plane that approximates the surface of the body using the proximity values derived from multiple emitter-detector pairs. Additionally or alternatively to generating a body surface plane, the plurality of proximity values may be used to compute a tilt angle of the device with respect to the body surface. The pairing between emitters and detectors in one mode may be decoupled such that the same emitters and detectors are re-assigned to other detectors and emitters to form other emitter-detector pairs or sets. For example, an emitter from one pair may be coupled with the detector of another pair to form a new emitter-detector pair. Sets of emitters and detectors formed by pairing emitters and detectors across different regions of a wearable device may help provide additional information regarding the distance and/or orientation of the device with respect to the body surface, and may allow the relative positioning of the device with the body surface to be determined even if certain emitters and/or detectors are obstructed (and/or subject to excessive noise or otherwise malfunctioning in some regard). Tilt angle data and/or changes in the computed body surface plane may be accumulated over time, and the controller may recognize a pattern of changes in the tilt angle or body surface plane as a wearer taking off, putting on, and/or otherwise adjusting the location of the device with respect to the body surface. The proximity value(s) derived from one or more emitter-detector pair may also be used to determine whether the device is located on the body surface or off the body surface (i.e., whether the individual is wearing the device or not). One method of determining whether a device is being worn by an individual is determining whether any proximity values (e.g., surface or z distance) of the plurality of emitter-detector pairs is below a first threshold or above a second threshold. If the surface distance of any of the emitter-detector pairs is below the first threshold, then the controller determines that the device is being worn by the individual. If the surface distance of any of the emitter-detector pairs is above the second threshold, then the controller determines that the device is not being worn by the individual. Changes in surface distance over time may also inform whether the device is being worn or not. In situations where an individual wears the device loosely on their body (e.g., a watch or belt strap that is not cinched against the skin of the wrist or waist/chest, and may shift and/or fall away somewhat from the body surface as the individual moves), there may be brief and/or irregular changes in the surface distance. Orientation information based on a body surface plane (e.g., pitch, roll) and/or surface distance information may be used to determine whether a device is worn loosely by an individual or is not being worn at all by the individual.

Interrogating or sampling of the body surface using a plurality of emitter-detector pairs may occur by activating multiple emitter-detector pairs simultaneously and/or activating emitter-detector pairs sequentially so that no two pairs are activated at the same time. Emitter-detector pairs that may operate in similar wavelength ranges and/or share the same detector may operate in a sequential manner to help reduce cross-talk between emitter-detector pairs. Emitter-detector pairs that operate in different wavelength ranges and/or have different detectors may operate simultaneously. In some variations, a multi-mode sensor may comprise a first emitter-detector pair using a first wavelength of light to collect information for deriving surface distance information and a second emitter-detector pair using a second wavelength of light that is different from the first wavelength to collect information for deriving orientation information of the device. For example, a first emitter-detector pair may use infrared light to obtain surface distance information and a second emitter-detector pair may use green light to obtain body surface plane and/or device surface plane orientation information (e.g., tilt angle, etc.).

Figure 4A:
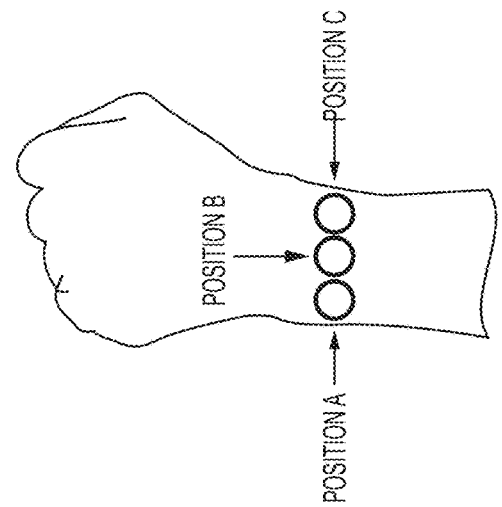
FIG. 4A depicts an exemplary multi-mode sensor in a wrist-worn device, and various device positions on the wrist.
Figure 4A:
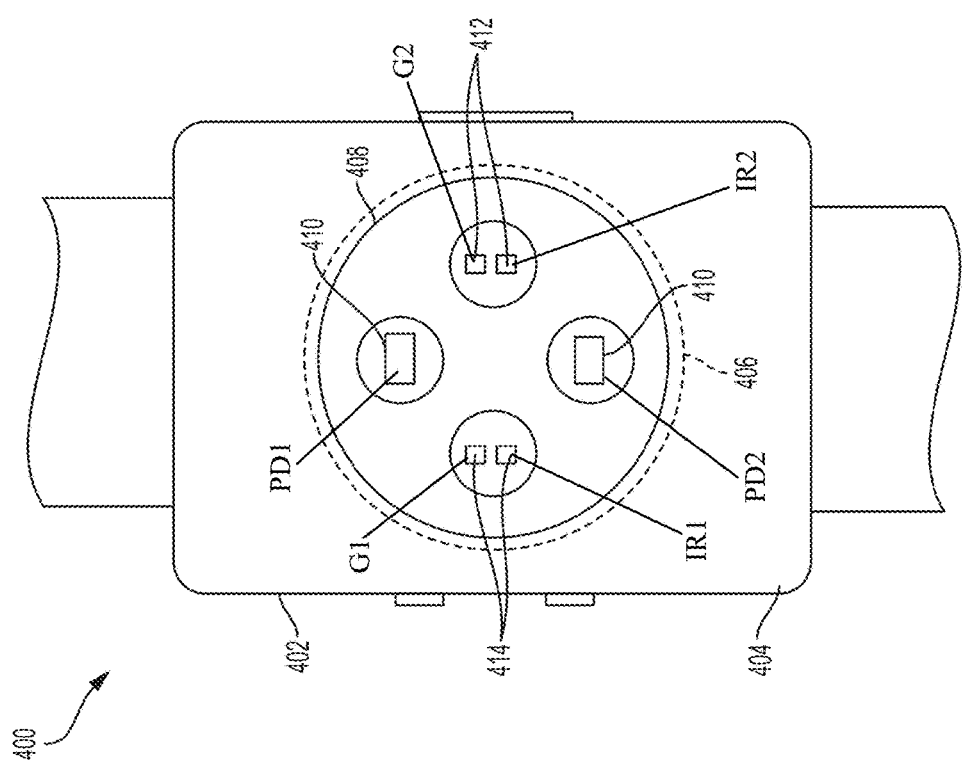
Figure 4B:
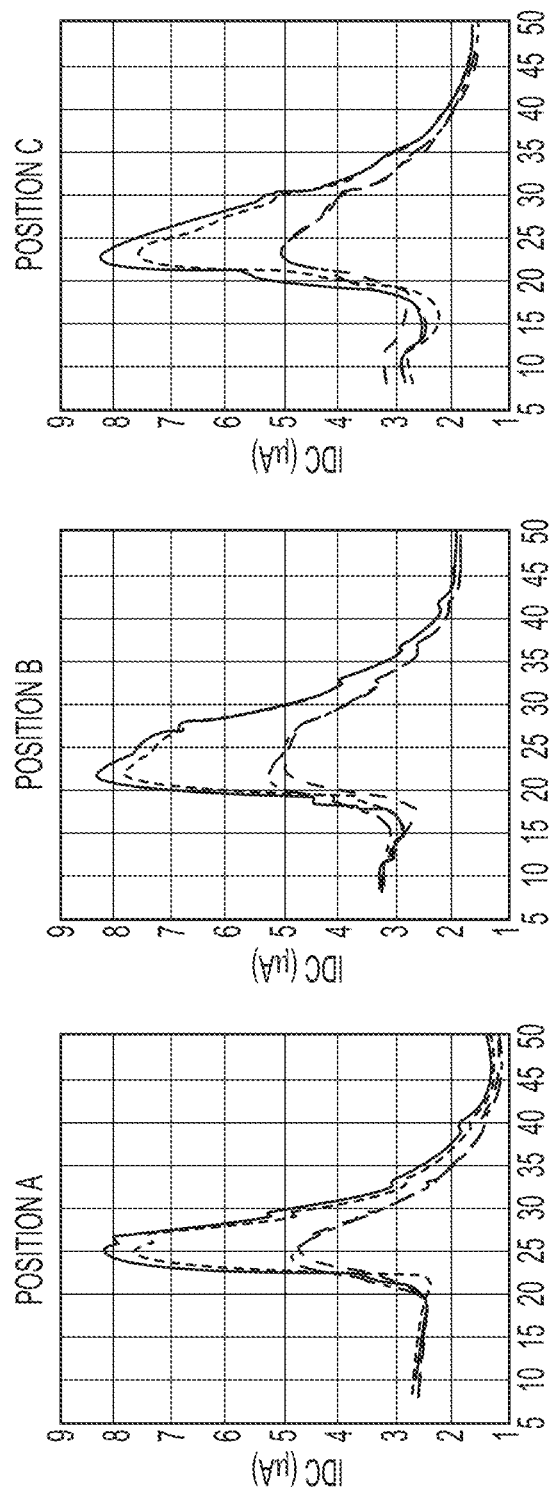
FIG. 4B depicts the green LED-PD proximity response curves generated at the various wrist-worn device positions shown in FIG. 4A.
Figure 4C:
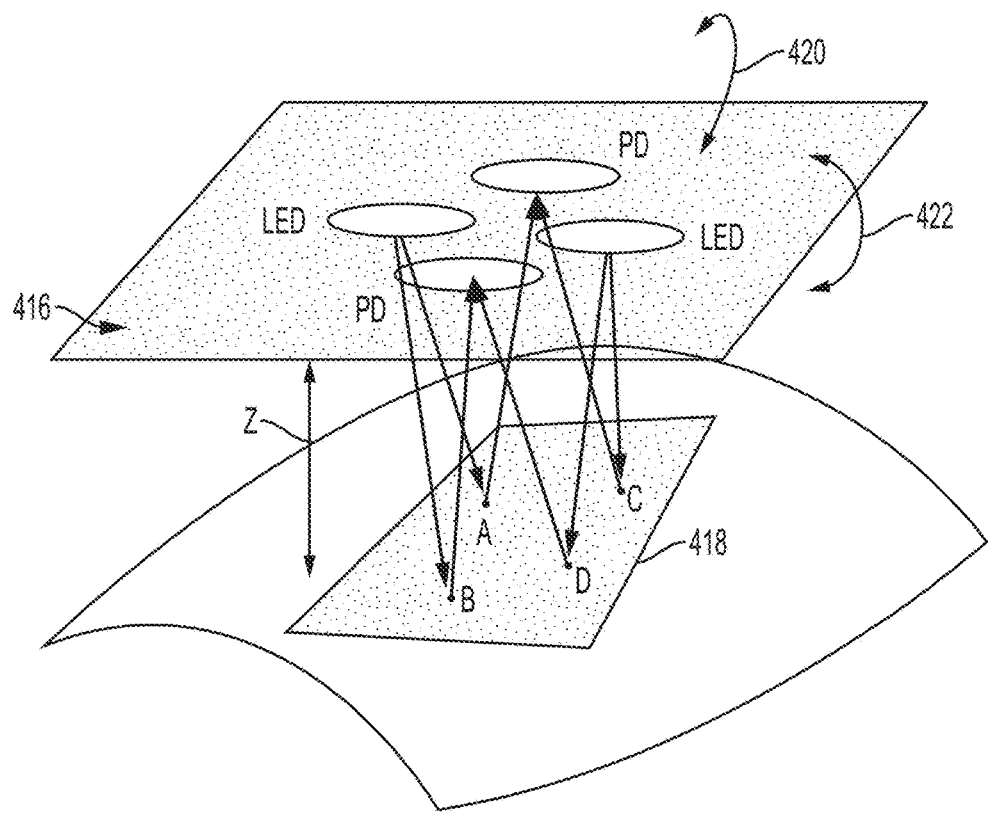
FIG. 4C illustrates the multiple light paths that can be formed between the LEDs and PDs of the multi-mode sensor shown in FIG. 4A, and how they can be used to determine relative surface orientation of the wrist-worn device to the wrist surface.

In variations where the wearable device comprises a wristwatch, the multi-mode sensor may be configured as shown in FIGS. 4A and 4C. Referring to FIG. 4A, wristwatch (400) includes a housing (402) having a back surface (404). A cover (406) on the back surface (404) of the housing (402) comprising multiple lenses (not shown) disposed over the LEDs and PDs protects a multi-mode sensor (408). Although the cover may be made from any suitable material, it is generally made with a ceramic material. Likewise, the lenses may be any suitable type of lens that allows light to be transmitted there through, e.g., sapphire lenses or polymer lenses. The multi-mode sensor (408) is configured to have the light emitters and photodetectors disposed across from one another in a surface plane (416) of the watch, which is illustrated in FIG. 4C. Accordingly, light travelling from the LEDs to various points (A, B, C, D) on the wrist surface/plane (418) and then to the photodetectors (as shown by the arrows), can have different path lengths. The length of the light paths may vary depending on the spacing and arrangement of the light emitters and photodetectors on the wearable device surface and their distance from the surface plane of the body area, e.g., the wrist. For example, the path length may range from about 4.5 mm to about 7.0 mm. In some variations, the path length may range from about 4.9 mm to about 6.5 mm. In other variations, the path length may be about 4.9 mm, about 5.4 mm, about 5.9 mm, or about 6.5 mm. It is understood that the arrangement of the light emitters and photodetectors shown in FIGS. 4A and 4C are representative, and that other arrangements are possible. Referring to FIG. 4A, two photodetectors (410) and four LED emitters are included in the watch (400); two being right LED emitters (412) and the other two being left LED emitters (414). Both right (412) and left (414) LED emitters comprise one green LED and one infrared LED.

With the four LEDs (G1, G2, IR1, IR2) and two photodetector (PD1, PD2) arrangement, multi-mode sensor (408) is capable of producing eight LED-PD paths. The possible emitter-detector pairs or sets that give rise to these eight LED-PD paths are summarized in FIG. 4D. However, it is understood that a multi-mode sensor can be configured to generate any suitable number of LED-PD paths, which may depend on the number of LEDs and PDs employed. For example, the multi-mode sensor may be can be configured to generate at least two, at least three, at least four, at least five, at least six, at least seven, or at least eight LED-PD paths, or more than eight LED-PD paths. Further, light data may be acquired from the two photodetectors using one or more of the modes summarized in FIGS. 4E and 4F. In some variations, one mode of operation of the multi-mode sensor may comprise activating emitter-detector pairs that comprise emitters that emit light of the same wavelength, for example, only green light or only infrared light. FIG. 4E depicts examples of emitter-detector pairs that use only a single wavelength of light to interrogate the body surface. Modes S1-S4 may comprise pairs or sets of emitter-detector pairs that share the same emitter (i.e., a green emitter or an IR emitter), but measure light from two photodetectors. The emitter-detector pairs in modes S1-S4 may acquire data concurrently or simultaneously (e.g., the emitter common to both pairs may be activated and light data may be acquired from both photodetectors during overlapping periods of time). Modes S5-S8 may comprise pairs or sets of emitter-detector pairs that have different emitters, but share the same photodetector. These emitter-detector pairs may acquire data sequentially (e.g., the first emitter-detector pair is activated and then deactivated before the second emitter-detector pair is activated). Modes S9-S12 may comprise pairs or sets of emitter-detector pairs that have different emitters that radiate the same wavelength light, and different photodetectors. These emitter-detector pairs may acquire data sequentially or simultaneously. For example, the emitter-detector pairs of modes S9-S12 may acquire data simultaneously if the separation distance between the first photodetector and second photodetector is large enough such that they are sampling from substantially different light environments, and/or if light from the emitter that is paired with each photodetector does not interfere or combine with light from the emitter that is paired with the other photodetector. Alternatively or additionally, the emitter-detector pairs of modes S9-S12 may acquire data sequentially if the location of the emitters and photodetectors are close enough to each other such that any light emitted from any emitter is detectable by all of the photodetectors (e.g., substantial amount of cross-talk is expected between the emitter-detector pairs). Though the emitters in the modes of FIG. 4E may emit light of the same wavelength, their location with respect to the photodetector may vary. For example, the controller may store relative location data between G1 and PD1 (e.g., G1 is to the left of PD1, with a first separation distance), and G2 and PD1 (e.g., G2 is to the right of PD1, with a second separation distance) in its memory. This difference in relative location may also be reflected in the proximity curve data for each of these pairs. Proximity curve data may be generated for all of the emitter-detector pairs listed in FIG. 4E (as previously described) and stored in a memory of the controller.

FIG. 4F depicts examples of emitter-detector pairs or sets that use multiple wavelengths of light to interrogate the body surface. Modes M1-M4 may comprise pairs or sets of emitter-detector pairs where PD1 senses green light data from either G1 or G2, and PD2 senses IR data from either IR1 or IR2. Modes M5-M8 may comprise pairs or sets of emitter-detector pairs where PD2 senses green light data from either G1 or G2, and PD1 senses IR data from either IR1 or IR2. The emitter-detector pairs in modes M1-M8 may acquire data simultaneously, since the two photodetectors may acquire data relating to two different wavelengths of lights (e.g., a first photodetector may acquire green wavelength light data and a second photodetector may acquire infrared wavelength light data). Alternatively or additionally, the emitter-detector pairs in modes M1-M8 may acquire data sequentially, as may be desirable. Modes M9-M16 may comprise pairs or sets of emitter-detector pairs where emitters of different wavelengths share a single photodetector. The emitter-detector pairs in modes M9-M16 may acquire data sequentially. The controller may store in its memory, along with relative location data between the emitters and detectors of the emitter-detector pairs as described above, the wavelength of light that is provided by the emitter, and therefore, the wavelength of light that is measured by the photodetector. In some variations, the photodetector may have one or more filters that may select for the wavelength of light that corresponds to the wavelength of light provided by the emitter that is paired/coupled to it. For example, an emitter-detector pair or sets a green light emitter may have a filter over the photodetector that transmits green light and blocks other light. Similarly, an emitter-detector pair or sets comprising an infrared light emitter may have a filter over the photodetector that transmits infrared light and blocks other light. Different filters may be disposed over a photodetector for the different modes, or a single, wavelength-tunable/selectable filter may be disposed over a photodetector and tuned for the different modes. Proximity curve data may be generated for all of the emitter-detector pairs listed in FIG. 4F (as previously described) and stored in a memory of the controller.

A wearable device having the number and types of emitters and photodetectors depicted in the watch (400) may use any combination of the modes in FIGS. 4E and 4F to measure distance and/or orientation of the wearable device with respect to a body surface, and/or may use all of the modes depicted in FIGS. 4E and 4F, or a subset of those modes. For example, a controller of the watch (400) may be programmed to use at least the modes summarized in FIG. 4G. Some modes may comprise emitters of a single wavelength of light (e.g., modes E1-E4), while other modes may comprise emitters that provide different wavelengths of light (e.g., modes E5-E8). For a particular mode, the emitter-detector pairs may acquire data sequentially or simultaneously, depending on the relative location of the emitters and detectors and sensitivity to cross-talk between the emitter-detector pairs. As an example, the emitter-detector pairs in modes E1-E4 may acquire data sequentially, since those pairs share the same photodetector, while the emitter-detector pairs in modes E5-E8 may acquire data simultaneously. In some variations, one or more of the modes E5-E8 may acquire data sequentially, while other of the modes E5-E8 may acquire data simultaneously. While some device controllers may use a combination of modes that include single wavelength emitter-detector pairs and multiple wavelength emitter-detector pairs to measure location and/or orientation data, it should be understood that other device controllers may use modes that include only single wavelength emitter-detector pairs or multiple wavelength emitter-detector pairs.

When placed on the wrist of an individual, wristwatch (400) is capable of determining relative surface orientation of the watch (400) to the wrist surface. For example, multi-mode sensor (410) can be used to generate four different green LED-PD proximity response curves (shown in FIG. 4B) at different wrist positions A, B, and C (as shown in FIG. 4A). In another example, as shown in FIG. 4C, multi-mode sensor (410) can be used to generate four green LED-PD paths (indicated by arrows) that sample multiple distances from the watch surface plane (416) to the surface plane of the wrist (418) at points A, B, C, and D. The LED-PD path lengths can be used to generate proximity response curves that may then be processed to provide a more robust determination of the distance between the device surface plane (416) and surface plane of the wrist (418), also referred to as z distance, as well as angular orientation (tilt angle) of the device relative to the surface plane of the wrist (418), including pitch angle (420) relative to the surface plane of the wrist (418) and roll angle (422) relative to the surface plane of the wrist (418). Knowledge of the z distance and angular orientation can then be used to sense the path trajectory of the watch when, e.g., the watch is placed on or taken off the wrist. It is understood that the multi-mode sensor configuration, light path and proximity curve generation, and surface distance and angular orientation calculations described above are not limited to wristwatches, and may be used in other types of wearable devices.

In some variations, proximity curves may be pre-generated (e.g., during a factory calibration step as part of the manufacturing process) and stored in the controller memory before the device worn by an individual. Proximity curve data, regardless of whether such data is pre-generated or generated while the device is worn by an individual, may be stored in a controller memory and recalled by the controller to map light data acquired by an emitter-detector pair or sets to surface distance, which may then in turn be used to compute the location and/or orientation of the device relative to a body surface.

A controller or processor may be included in the wearable device and be configured to execute algorithms for generating the proximity curves, LED-PD path lengths, z distances, and angular orientation of the device, and control the reception and manipulation of input and output data between components of wearable device. The processor can be a single-chip processor or can be implemented with multiple components.

The wearable devices may also include a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Methods for detecting relative surface orientation of a wearable device to a body surface of an individual are further disclosed herein. The methods generally use a multi-mode sensor capable of employing multiple sensor modes in generating proximity curve data. The multiple sensor modes can be created by providing a multi-mode sensor that includes light emitters and photodetectors that form multiple emitter-detector pairs or sets. The emitter-detector pairs may have various spacing between the light emitter and its corresponding photodetector. The various modes may be employed to detect the distance to a target surface, e.g., the wrist surface, by direct methods (e.g., direct measurement of the proximity response of a single emitter-detector pair and correlating the response to distance), by a differential or comparative measurement (e.g., by using the differences in response of each emitter-detector pair to enable a more accurate determination of relative surface distance), or by a combination of direct, differential, and comparative measurements. In one variation, comparative processing of proximity curve information is used to detect distance or relative surface orientation of the wearable device to a body surface of the user.

The methods generally include the steps of: a) attaching the wearable device to the body surface, the wearable device comprising a housing; and a multi-mode sensor within the housing, the multi-mode sensor comprising a plurality of emitter-detector pairs or sets configured to generate a plurality of light paths, where each of the plurality of emitter-detector pairs comprises a light emitter and a corresponding photodetector, and where the light emitter and corresponding photodetector have a separation distance; and a processor within the housing; and b) generating a proximity value relating to relative surface orientation of the housing to a body surface of an individual using an algorithm run by the processor, where the algorithm uses information from at least two of the emitter-detector pairs. The information used by the algorithm may include proximity curve data for at least two of the emitter-detector pairs, and the proximity curve data may be based upon information obtained from the plurality of light paths, e.g., the path length of the light that travels between a light emitter and photodetector of an emitter-detector pair. The generated proximity value may correspond to a surface distance (z distance), a tilt value, or a combination thereof, between the wearable device and the body surface.

Attachment of the wearable device to a user can be accomplished in various ways. For example, the wearable device can be secured to a user by attachment mechanisms such as, but not limited to, armbands, headbands, watchstraps, and belts, as previously stated. Other types of attachment mechanisms may include bands that may be secured to the user through the use of hooks and loops (e.g., Velcro), a clasp, and/or a band having memory of its shape, e.g., through the use of a spring metal band.

The emitter-detector pairs or sets of the multi-mode sensor can be formed by variously pairing/combining the light emitters with a corresponding photodetector. For example, a single light emitter can be combined with a plurality of photodetectors to form emitter-detector pairs, a plurality of light emitters can be combined with a single photodetector to form emitter-detector pairs, or a plurality of light emitters can be combined with a plurality of photodetectors to form emitter-detector pairs. For certain wearable devices, such as the wristwatch shown in FIG. 4A, it may be useful to form emitter-detector pairs or sets by combining four light emitters and two photodetectors.

The light emitter and photodetector of each emitter-detector pair or sets has a separation distance and/or location within a plane, e.g., a surface plane of a wearable device, as previously stated. The separation distance may be the same or different for the emitter-detector pairs. Using the various separation distances and/or planar locations, the multi-mode sensor has modes upon which to obtain proximity curve data. In some instances, proximity curve data generated for at least two emitter-detector pairs is used to generate a proximity value corresponding to a surface distance, tilt value, or a combination thereof, between the wearable device and the body surface. The proximity curve data may be based upon the path length of light travelled between a light emitter and a corresponding photodetector of an emitter-detector pair. The generated proximity curves may then be correlated to the distance to a target surface (surface distance or z distance). For example, and as shown in FIG. 2B, the proximity curve (206) for the L1-PD emitter-detector pair and proximity curve (208) for the L2-PD emitter-detector pair can be used to extrapolate a z distance (provided on the z-axis) to a target surface.

In general, the separation distance between the light emitters and photodetectors of the emitter-detector pairs or sets may range from about 1 mm to about 10 mm, from about 2 mm to about 8 mm, or from about 3 mm to about 7 mm. For example, the emitter-detector separation distance may be about 1 mm, about 2 mm, about 3 mm, about 4 mm, about 5 mm, about 6 mm, about 7 mm, about 8 mm, about 9 mm, or about 10 mm. However, it is understood that any separation distance may be used that generates suitable proximity curve data for detecting relative surface orientation. The length of light paths may vary depending on the spacing and arrangement of the light emitters and photodetectors on the wearable device surface and their distance from the surface plane of the body area, e.g., the wrist. For example, the path length may range from about 4.5 mm to about 7.0 mm. In some variations, the path length may range from about 4.9 mm to about 6.5 mm. In other variations, the path length may be about 4.9 mm, about 5.4 mm, about 5.9 mm, or about 6.5 mm.

In some instances, e.g., when the target surface has wavelength dependent properties, illumination wavelength may be used as another sensor parameter or mode upon which to base the proximity curves. That is, illumination with one or more different wavelengths of light may be used alone or in addition to separation distance to generate varying proximity responses, as was described above for FIGS. 3A and 3B. Any suitable wavelength of light may be used.

When using proximity curves to determine relative surface orientation, the proximity curve for at least two emitter-detector pairs or sets may be compared. In some instances, the proximity curve for at least three emitter-detector pairs may be compared, the proximity curve for at least four emitter-detector pairs may be compared, or the proximity curve for at least five emitter-detector pairs may be compared. However, any suitable number of proximity curves may be compared that helps to generate a more robust determination of relative surface orientation.

In some instances, the emission and viewing angles of the light emitter and the photodetector can be used as a sensor mode, in addition to emitter-detector separation distances. Here proximity curves generated by illuminating a target surface with light having different emission and/or detection angles using one or more emitter-detector pairs can be compared, similar to the proximity curve generation and comparison described for FIG. 3B.

The proximity curve data that is processed from the emitter-detector pairs or sets may be used to generate a proximity value that generally correlates to a distance between the surface plane of the wearable device and the surface plane of a body surface (z distance), and angular orientation/tilt angle (e.g., the pitch angle and roll angle) of the device relative to the body surface. A processor included in the wearable device will generally be configured to execute algorithms for generating the proximity curve data, proximity curves, LED-PD path lengths, z distances, and angular orientation of the device, and control the reception and manipulation of input and output data between components of wearable device.

Figure 5A:
FIG. 5A is a flowchart depiction of one method for detecting relative surface orientation of a wearable device to a body surface of an individual.
Figure 5B:
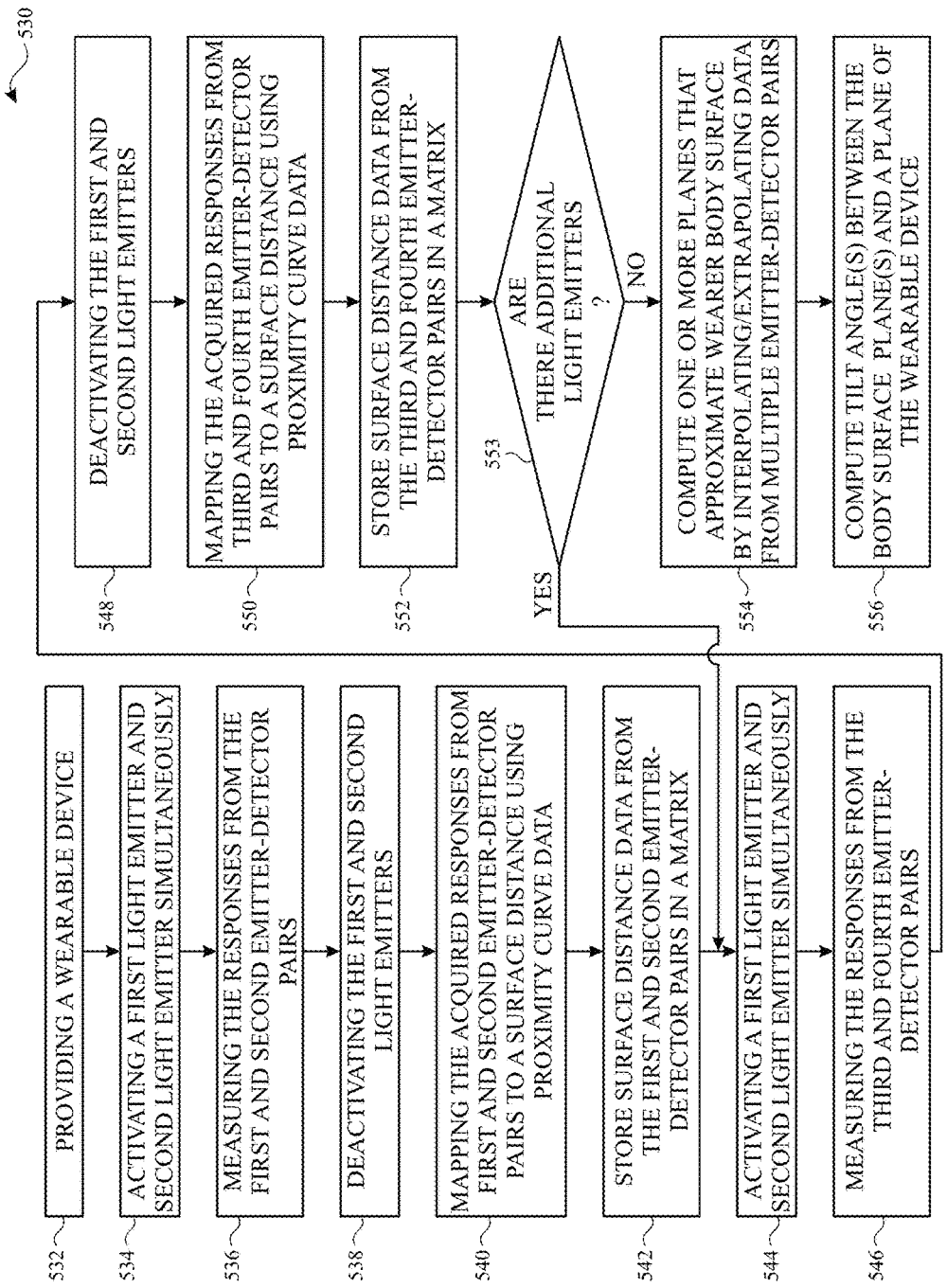
FIG. 5B is a flowchart depiction of another method for detecting relative surface orientation of a wearable device to a body surface of an individual.

Other variations of methods for detecting relative surface orientation of a wearable device to a body surface of an individual are depicted in FIGS. 5A-5B. These methods acquire data from one or more emitter-detector pairs or sets, map the acquired data for each emitter-detector pair to location data (e.g., surface distance or z distance) based on proximity curve data (stored in the controller memory) specific to that emitter-detector pair, and generate a plane that approximates the body surface of the wearer (e.g., identifying coordinates of a point located on the body surface based on the predetermined/known position of the emitter relative to the detector in conjunction with a surface distance based on proximity curve data for at least three emitter-detector pairs, and deriving the equation of a plane defined by the coordinates of the three body surface points, and/or interpolating between at least three surface distance points to define a body surface plane). In one variation, the method (500) may comprise providing (502) a wearable device comprising a multi-mode sensor comprising a first light emitter, a second light emitter, a first photodetector, a second photodetector, and a controller in communication with the multi-mode sensor. The first light emitter and the first photodetector may form a first emitter-detector pair or set and the first light emitter and the second photodetector may form a second emitter-detector pair or set. The second light emitter and the first photodetector may form a third emitter-detector pair and the second light emitter and the second photodetector may form a fourth emitter-detector pair. In some variations, the wearable device may be the watch device (400) depicted in FIG. 4A. The first and second light emitters may provide light having the same or different wavelength, but for this example, the light from the first and second light emitters have the same wavelength. The method (500) may comprise activating (504) the first light emitter, measuring (506) the responses at the first photodetector and the second photodetector, deactivating (508) the first light emitter, and mapping (510) the data acquired from the first and second photodetectors (i.e., data from the first and second emitter-detector pairs) to a surface distance or z distance value using proximity curve data stored in controller memory that is specific to each of the first emitter-detector pair and the second emitter-detector pair. The two surface distances based on the first and second emitter-detector pairs may be stored (512) in a matrix. Next, the method (500) may comprise activating (514) the second light emitter, measuring (516) the responses at the first photodetector and the second photodetector, deactivating (518) the second light emitter, and mapping (520) the data acquired from the first and second photodetectors (i.e., data from the third and fourth emitter-detector pairs) to a surface distance or z distance value using proximity curve data stored in controller memory that is specific to each of the third emitter-detector pair and the fourth emitter-detector pair. The two surface distances based on the third and fourth emitter-detector pairs may be stored (522) in the matrix, which now has four data points. These steps may be sequentially repeated (523) for any number of additional light emitters (e.g., where the first and second light emitters emit green light, third and fourth light emitters may emit infrared light), and for any number of emitter-detector pairs (such as the pairs and modes depicted in FIGS. 4D-4E). The controller may then compute (524) one or more planes that approximate the body surface of the wearer based on the surface distance data points in the matrix. For example, the controller may interpolate and/or extrapolate between and/or beyond the data points in the matrix to define one or more body surface planes (e.g., deriving the equation for a plane based on at least three data points in the matrix), and may optionally further compute (526) tilt angle(s) of the body surface plane(s) relative to a surface of the device housing.

Another variation of a method for detecting relative surface orientation of a wearable device to a body surface of an individual is depicted in FIG. 5B. The method (530) may comprise providing (532) a wearable device comprising a multi-mode sensor comprising a first light emitter, a second light emitter, a first photodetector, a second photodetector, and a controller in communication with the multi-mode sensor. The first light emitter and the first photodetector may form a first emitter-detector pair or set and the first light emitter and the second photodetector may form a second emitter-detector pair or set. The second light emitter and the first photodetector may form a third emitter-detector pair and the second light emitter and the second photodetector may form a fourth emitter-detector pair. In some variations, the wearable device may be the watch device (400) depicted in FIG. 4A. The first and second light emitters may provide light having the same or different wavelength, but for this example, the light from the first and second light emitters have different wavelengths. The method (530) may comprise simultaneously activating (534) the first light emitter and second light emitters, measuring (536) the responses from the first emitter-detector pair and the second emitter-detector pair, deactivating (538) the first and second light emitters, and mapping (540) the data acquired from first and second emitter-detector pairs to a surface distance or z distance value using proximity curve data stored in controller memory that is specific to each of the first emitter-detector pair and the second emitter-detector pair. The two surface distances based on the first and second emitter-detector pairs may be stored (542) in a matrix. Next, the method (530) may comprise simultaneously activating (544) the first and second light emitters, measuring (546) the responses from the third emitter-detector pair and the fourth emitter-detector pair, deactivating (548) the first and second light emitters, and mapping (550) the data acquired from the third and fourth emitter-detector pairs to a surface distance or z distance value using proximity curve data stored in controller memory that is specific to each of the third emitter-detector pair and the fourth emitter-detector pair. The two surface distances based on the third and fourth emitter-detector pairs may be stored (552) in the matrix, which now has four data points. These steps may be repeated (553) for any number of additional light emitters (e.g., the first light emitter may emit green light and the second light emitter may emit infrared light, a third light emitter at a different location from the first light emitter may emit green light and a fourth light at a different location from the second light emitter may emit infrared light), and for any number of emitter-detector pairs (such as the pairs and modes depicted in FIGS. 4D-4E). The controller may then compute (554) one or more planes that approximate the body surface of the wearer based on the surface distance data points in the matrix. For example, the controller may interpolate and/or extrapolate between and/or beyond the data points in the matrix to define one or more body surface planes, and may optionally further compute (556) tilt angle(s) of the body surface plane(s) relative to a surface of the device housing. A wearable device controller may determine the relative surface orientation and/or location of the wearable device using one or both of the methods depicted in FIGS. 5A and 5B.

Figure 6A:
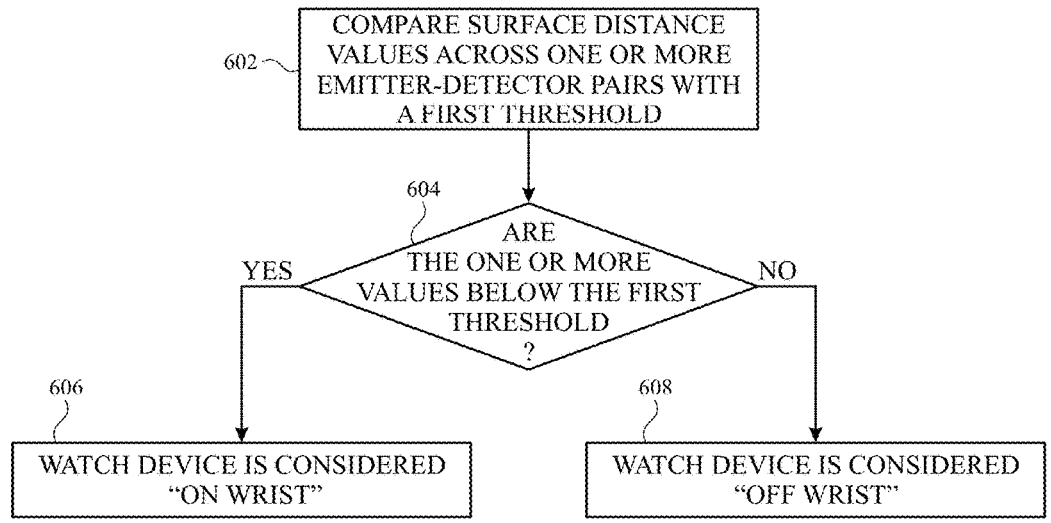
FIGS. 6A and 6B are flowchart depictions of methods (that may be used separately or together) to determine whether a wrist-worn device worn by an individual.

Depending on the relative surface orientation of the wearable device as computed by any of the methods described above, the device may be turned to a locked state. For example, if the detected relative surface orientation of a wristwatch determines that the watch is "off wrist," then the watch may be turned to a locked (i.e., where a passcode is required to access information on the device) or low power state. Alternatively, if the detected relative surface orientation of the wristwatch determines that the watch is "on wrist", then the watch may be turned to an unlocked state (i.e., where a passcode is not required to access information on the device). In some variations, the surface distance data stored in the matrices described above may be used to determine whether a wristwatch is "on wrist" or "off wrist." For example, one method may comprise the one or more of the methods depicted in FIGS. 6A and 6B. As depicted in FIG. 6A, a first predetermined proximity threshold may be selected and compared to surface distance values across one or more emitter-detectors pairs (602). If the surface distance detected by any emitter-detector pair is below this first threshold (604), then the wrist-watch is determined to be "on wrist" (606). If none of the surface distances as detected by any emitter-detector pairs is below this first threshold, then the wrist-watch is determined to be "off wrist" (608).

Figure 6B:
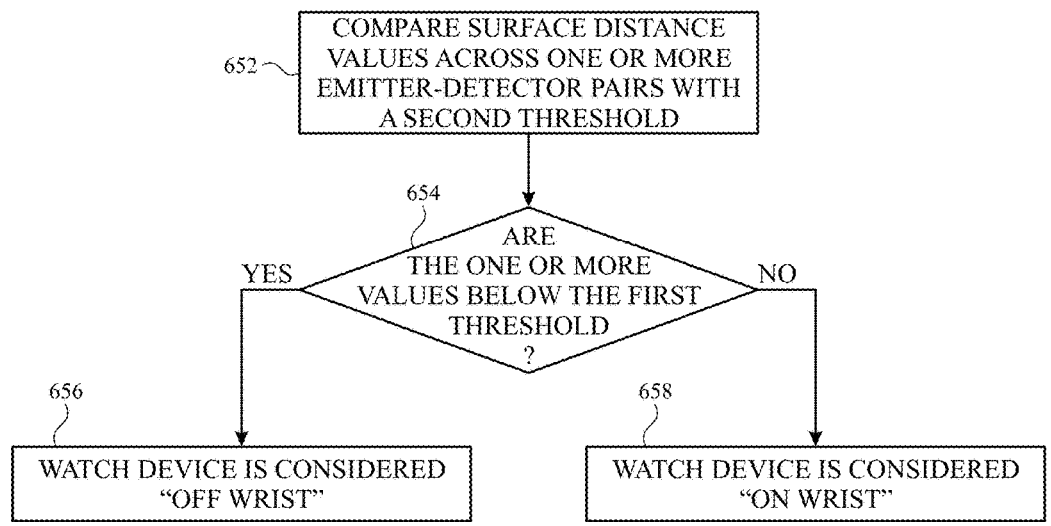

Alternatively or additionally, as depicted in FIG. 6B, a second predetermined proximity threshold may be selected and compared to surface distance values across one or more emitter-detectors pairs (652). If the surface distance detected by any emitter-detector pair is above this second threshold (654), then the wristwatch is determined to be "off wrist" (656). If none of the surface distances as detected by any emitter-detector pairs is above this second threshold, then the wrist-watch is determined to be "on wrist" (658).

Figure 7A:
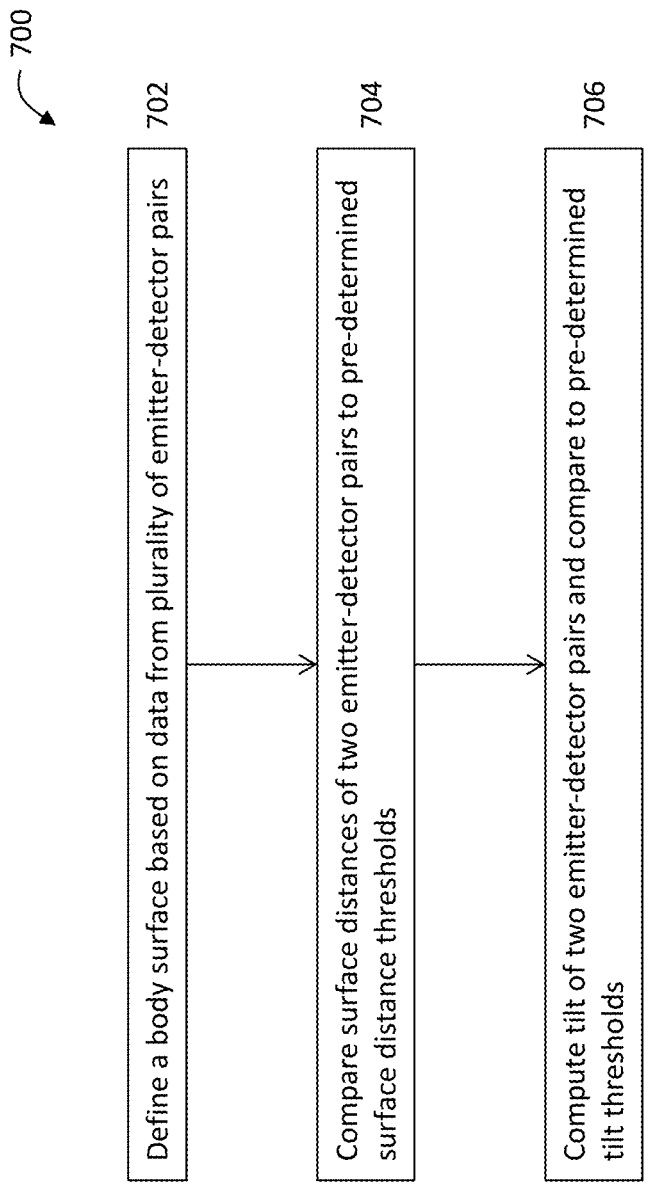
FIG. 7A is a flowchart depiction of one variation of a method to determine whether a wrist-worn device worn by an individual.

In some variations, the surface distance data across multiple emitter-detector pairs may be compared to a range of surface distances defined by an upper bound and a lower bound (e.g., the lower bound may be the first threshold and the upper bound may be second threshold). For example, if a numerical value (e.g., mean, median, weighted average, etc.) that represents the surface distances across multiple emitter-detector pairs fall within the range, then the controller may then incorporate tilt angle data to determine whether the watch is "on wrist" or "off wrist." FIG. 7A schematically represents one method 700 that utilizes distance and tilt data from at least two emitter-detector pairs to determine whether a wrist-worn device is tilted and worn on the wrist, or tilted and not worn on the wrist. Method 700 may comprise defining 702 a body surface based on data from plurality of emitter-detector pairs, comparing 704 surface distances of two emitter-detector pairs to pre-determined surface distance thresholds and computing 706 the tilt of two emitter-detector pairs and comparing to pre-determined tilt thresholds. Some methods 700 may comprise all three steps 700, 702, 704 making use of surface distance data and tilt data, while other methods may include using only surface distance data as described in step 702, or only tilt data as described in step 704, with or without defining 702 a body surface.

FIGS. 7B-7E depict one variation of step 704 that uses separation distance data of at least two emitter-detector pairs to determine whether the watch is "on wrist" or "off wrist." The method may comprise a plurality of predetermined thresholds, for example, a low threshold $Th_{Low}$, and/or a high threshold $Th_{High}$, and/or a first threshold $Th_1$, and/or a second threshold $Th_2$. The first threshold $Th_1$ may or may not be the same as $Th_{Low}$, while the second threshold $Th_2$ may or may not be the same as $Th_{High}$. The method may compare the distance between a first location 710 on the device (based on data from a first emitter-detector pair) and the body surface 701 (i.e., separation distance $SD_1$) and the distance between a second location 712 on the device (based on data from a second emitter-detector pair) and the body surface 701 (i.e., separation distance $SD_2$) with one or more of these thresholds to determine whether the watch is on the wrist or off the wrist.

If both separation distances $SD_1$ and $SD_2$ are below the low threshold $Th_{Low}$ as depicted in FIG. 7B, the controller may determine that the watch is located on the wrist. If both separation distances $SD_1$ and $SD_2$ are above the high threshold $Th_{High}$ as depicted in FIG. 7C, the controller may determine that the watch is located off the wrist. If the first separation distance $SD_1$ is below the first threshold $Th_1$, and the second separation distance $SD_2$ is below the second threshold $Th_2$ as depicted in FIG. 7D, the controller may determine that the watch is located on the wrist. If the first separation distance $SD_1$ is below the first threshold $Th_1$, and the second separation distance $SD_2$ is above the second threshold $Th_2$ as depicted in FIG. 7E, the controller may determine that the watch is located off the wrist.

Figure 7G:
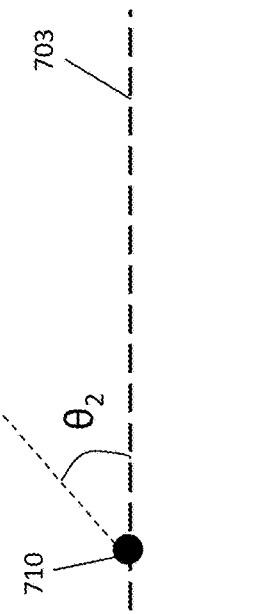
FIGS. 7F and 7G schematically depict one variation of a method using tilt angle data to determine whether the wrist-worn device is worn by an individual.
Figure 7F:
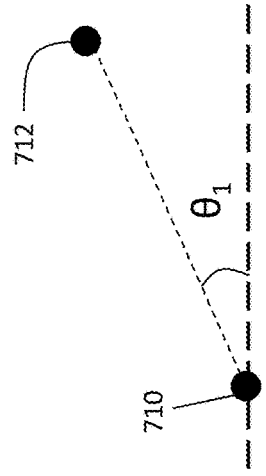

The first and second thresholds $Th_1$, $Th_2$ may be selected for a particular set of two emitter-detector pairs as corresponding to a particular range of tilt angles that map to an on-wrist state. For example, the tilt angle of the condition depicted in FIG. 7D may be within a range of tilt angles that map to the on-wrist state, while the tilt angle of the condition depicted in FIG. 7E may be outside (e.g., greater than) the range of tilt angles that map to the on-wrist state, so the controller considers the watch to be off-wrist. In some variations, step 706 may comprise using data from a plurality of emitter-detector pairs to compute a tilt angle of the device with respect to the computed body surface, and comparing the computed tilt angles between a set of (e.g., at least two) emitter-detector pairs against a pre-determined tilt angle range or threshold to determine whether the watch is on-wrist or off-wrist. Such method may be used, for example, in conditions where the separation distance of the emitter-detector pairs from the body surface is between the low threshold $Th_{Low}$ and the high threshold $Th_{High}$. For example, a controller may determine the tilt angle θ based on first and second locations 710, 712 on the device (derived from data acquired by first and second emitter-detector pairs) by computing the angle between a line connecting the first location 710 and the second location 712, and a line 703 that intersects the first location 710 and is parallel to a region of the body surface 701. FIG. 7F depicts a condition where the angle $θ_1$ is within a tilt angle range (or below a tilt angle threshold) that maps to an on-wrist state, while FIG. 7G depicts a condition where the angle $θ_2$ is outside a tilt angle range (or above a tilt angle threshold) that maps to an on-wrist state, and is determined as being in an off-wrist state. Some methods 700 may use one or more of the methods depicted in FIGS. 7B-7E. Alternatively or additionally, some methods 700 may use the method depicted in FIGS. 7F and 7G. Alternatively or additionally, still other methods may use the methods depicted in FIGS. 6A and 6B.

In some variations, the surface distance values and/or body surface plane(s) and/or tilt angles over time may be stored in a controller memory and analyzed by the controller to identify any patterns in watch device movement with respect to the body surface. For example, erratic changes in body surface plane tilting (e.g., increases and decreases in tilt angle over a predetermined interval of time) and/or surface distance values (e.g., where the watch device moves away and towards the body surface over a predetermined interval of time) may indicate that the device is worn by the individual, but may be worn loosely such that its relative position to the body surface changes as the individual moves. A consistent change in body surface plane tilting (e.g., monotonically increasing or decreasing tilt angles over a predetermined interval of time) and/or surface distance values (e.g., monotonically increasing or decreasing surface distance values over a predetermined interval of time) may indicate that the individual may be deliberately manipulating the device, for example, taking off the device or putting on the device. Relatively small changes in the body surface plane tilting and/or surface distance values may indicate that the device is worn firmly against the individual's body surface and/or that the device is not being worn but is instead placed on a hard surface. Data from infrared emitter-detector pairs may be able to distinguish between placement of the device against an individual's body surface from placement of the device on a tabletop. In some variations, additionally or alternatively to methods comprising the activation of one or more light emitters, ambient light may be used to detect whether a wearable device is worn or unworn. This may help to conserve the battery life of the wearable device. For example, if a photodetector located on the skin-contacting surface of the wearable device detects little or no ambient light, the controller may determine that the wearable device is placed firmly against a surface, and only the infrared emitter is activated to determine whether that surface is a body surface or an object surface. If, however, it cannot be determined from the ambient light levels whether the device is worn or not, then additional interrogation of the body surface using any of the methods described herein may be used.

In some variations, the processor together with an operating system can operate to execute computer code and produce and use data. The computer code and data can reside within a program storage block that can be operatively coupled to the processor. The program storage block can generally provide a place to hold data that is being used by the operating system. The program storage block can be any non-transitory computer-readable storage medium, and can store, for example, history and/or pattern data relating to proximity curves measured by one or more photodetectors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

A wearable device is disclosed. The wearable device can comprise: a wearable housing;

first and second light emitters; first and second light detectors, wherein the first and second light emitters and the first and second light detectors are located within the housing and are each individually and independently controllable, each of the first and second light detectors associated with at least one of a set of emitter-detector pairs, the set of emitter-detector pairs comprising: a first emitter-detector pair comprising the first light emitter and the first light detector, a second emitter-detector pair comprising the first light emitter and the second light detector, and a third emitter-detector pair comprising the second light emitter and the first light detector pair, wherein the position of the emitter relative to the detector in each emitter-detector pair is predetermined; and a controller within the housing and in communication with the first and second light emitters and the first and second detectors, wherein the controller is configured to: select one or more of the set of emitter-detector pairs, activate the light emitter(s) of the one or more of the set emitter-detector pairs, acquire light data from the one or more emitter-detector pairs, and determine a relative z-distance and tilt angle of a housing surface to a surface of a user based on the light data from the one or more of the set of emitter-detector pairs. Additionally or alternatively, in some examples, the set of emitter-detector pairs further comprises a fourth emitter-detector pair comprising the second light emitter and the second light detector. Additionally or alternatively, in some examples, the first light emitter and the second light emitter both emit green light. Additionally or alternatively, in some examples, the first light emitter and the second light emitter both emit infrared light. Additionally or alternatively, in some examples, the first light emitter emits green light and the second light emitter emits infrared light. Additionally or alternatively, in some examples, the emitter and the detector of each emitter-detector pair have a predetermined separation distance, wherein the separation distance ranges from about 2 mm to about 8 mm. Additionally or alternatively, in some examples, the separation distance of the emitter-detector pairs are different from other emitter-detector pairs. Additionally or alternatively, in some examples, the separation distance of one of the emitter-detector pairs is the same as the separation distance of at least one other of the emitter-detector pairs. Additionally or alternatively, in some examples, the first and second light emitters are included in a light emitters array and the first and second light detectors are included in a light detector array, the light emitter array and light detectors array are located on a first plane of the housing, and the controller is further configured to: acquire light data from a third emitter-detector pair comprising an emitter from the light emitters array and a detector from the light detectors array, wherein the position of the emitter relative to the detector is predetermined, map the light data from each of the first, second and third emitter-detector pairs to a surface distance value using proximity curve data generated for each of the first, second and third emitter-detector pairs, and generate a second plane based on the surface distance values from the first, second and third emitter-detector pairs. Additionally or alternatively, in some examples, the controller is further configured to determine the tilt angle from an angle between the first plane and the second plane. Additionally or alternatively, in some examples, the tilt angle comprises a pitch angle between a first axis of the first plane and a first axis of the second plane. Additionally or alternatively, in some examples, the tilt angle comprises a roll angle between a second axis of the first plane and a second axis of the second plane, wherein the second axes of the first and second planes are perpendicular to the first axes of the first and second planes respectively.

A method for detecting relative surface orientation of a wearable device to a body surface of an individual is disclosed. The method can comprise: providing a wearable device, the wearable device comprising: a wearable housing, a first light emitter, a second light emitter, a first light detector, a second light detector, and a controller in communication with the each of the light emitters and light detectors; acquiring proximity data from a first emitter-detector pair, the first emitter-detector pair comprising: the first emitter and the first light detector, wherein acquiring proximity data comprises activating the first light source, measuring light data from the first light detector, and mapping the measured light data to a first separation distance (z distance) using proximity curve data generated for the first emitter-detector pair; acquiring proximity data from a second emitter-detector pair, the second-emitter detector pair comprising: the second emitter and the first light detector, wherein acquiring proximity data comprises activating the second light source, measuring light data from the second light detector, and mapping the measured light data to a second separation distance (z distance) using proximity curve data generated for the second emitter-detector pair; triangulating the proximity data from the first and second emitter-detector pairs to compute a plane that approximates the body surface; and computing a tilt angle of a plane of the housing with respect to the body surface plane. Additionally or alternatively, in some examples, the first emitter emits light having a first wavelength and the second emitter emits light having a second wavelength different from the first wavelength, and acquiring proximity data from the first emitter-detector pair and acquiring data from the second emitter-detector pair occur concurrently. Additionally or alternatively, in some examples, the first emitter emits green light and the second emitter emits infrared light. Additionally or alternatively, in some examples, the first and second emitters emit the same wavelength light, and acquiring proximity data from the first emitter-detector pair and acquiring data from the second emitter-detector pair occur sequentially. Additionally or alternatively, in some examples, the method further comprises: acquiring proximity data from a third emitter-detector pair, the third emitter-detector comprising: the first emitter and a second detector, wherein acquiring proximity data comprises activating the first light source, measuring light data from the second light detector, and mapping the measured light data to a third separation distance (z distance) using proximity curve data generated for the third emitter-detector pair. Additionally or alternatively, in some examples, the method further comprising: re-assigning each of the first emitter, the second emitter, the first light detector, and the second light detector to another emitter-detector pair; and acquiring proximity data from each another emitter-detector pair. Additionally or alternatively, in some examples, the method further comprises: comparing the first and second separation distances to a threshold value; and determining the device is located off-wrist when the first and second separation distances are above the threshold value. Additionally or alternatively, in some examples, the method further comprises: comparing the first separation distance to a first threshold value; comparing the second separation distance to a second threshold value; and determining the device is located off-wrist when the first separation distance is below the first threshold value and the second separation distance is above the second threshold value.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A wearable device comprising:
a wearable housing;
first and second light emitters;
first and second light detectors, wherein the first and second light emitters and the first and second light detectors are located within the housing and are each individually and independently controllable, each of the first and second light detectors associated with at least one of a set of emitter-detector pairs,
the set of emitter-detector pairs comprising:
a first emitter-detector pair comprising the first light emitter and the first light detector,
a second emitter-detector pair comprising the first light emitter and the second light detector, and
a third emitter-detector pair comprising the second light emitter and the first light detector pair,
wherein the position of the emitter relative to the detector in each emitter-detector pair is predetermined; and
a controller within the housing and in communication with the first and second light emitters and the first and second detectors, wherein the controller is configured to:
select one or more of the set of emitter-detector pairs,
activate the light emitter(s) of the one or more of the set emitter-detector pairs,
acquire light data from the one or more emitter-detector pairs, and
determine a relative z-distance and tilt angle of a housing surface to a surface of a user based on the light data from the one of more of the set of emitter-detector pairs.

2. The wearable device of claim 1, wherein the set of emitter-detector pairs further comprises a fourth emitter-detector pair comprising the second light emitter and the second light detector.

3. The wearable device of claim 1, wherein the first light emitter and the second light emitter both emit green light.

4. The wearable device of claim 1, wherein the first light emitter and the second light emitter both emit infrared light.

5. The wearable device of claim 1, wherein the first light emitter emits green light and the second light emitter emits infrared light.

6. The wearable device of claim 1, wherein the emitter and the detector of each emitter-detector pair have a predetermined separation distance, wherein the separation distance ranges from about 2 mm to about 8 mm.

7. The wearable device of claim 6, wherein the separation distance of the emitter-detector pairs are different from other emitter-detector pairs.

8. The wearable device of claim 6, wherein the separation distance of one of the emitter-detector pairs is the same as the separation distance of at least one other of the emitter-detector pairs.

9. The wearable device of claim 1, wherein the first and second light emitters are included in a light emitters array and the first and second light detectors are included in a light detector array, the light emitter array and light detectors array are located on a first plane of the housing, and the controller is further configured to:
acquire light data from a third emitter-detector pair comprising an emitter from the light emitters array and a detector from the light detectors array, wherein the position of the emitter relative to the detector is predetermined,
map the light data from each of the first, second and third emitter-detector pairs to a surface distance value using proximity curve data generated for each of the first, second and third emitter-detector pairs, and
generate a second plane based on the surface distance values from the first, second and third emitter-detector pairs.

10. The wearable device of claim 9, wherein the controller is further configured to determine the tilt angle from an angle between the first plane and the second plane.

11. The wearable device of claim 10, wherein the tilt angle comprises a pitch angle between a first axis of the first plane and a first axis of the second plane.

12. The wearable device of claim 10, wherein the tilt angle comprises a roll angle between a second axis of the first plane and a second axis of the second plane, wherein the second axes of the first and second planes are perpendicular to the first axes of the first and second planes respectively.

13. A method for detecting relative surface orientation of a wearable device to a body surface of an individual comprising:
providing a wearable device, the wearable device comprising:
a wearable housing,
a first light emitter,
a second light emitter,
a first light detector,
a second light detector, and
a controller in communication with the each of the light emitters and light detectors;
acquiring proximity data from a first emitter-detector pair, the first emitter-detector pair comprising:
the first emitter and the first light detector, wherein acquiring proximity data comprises activating the first light source, measuring light data from the first light detector, and mapping the measured light data to a first separation distance (z distance) using proximity curve data generated for the first emitter-detector pair;
acquiring proximity data from a second emitter-detector pair, the second-emitter detector pair comprising:
the second emitter and the first light detector, wherein acquiring proximity data comprises activating the second light source, measuring light data from the second light detector, and mapping the measured light data to a second separation distance (z distance) using proximity curve data generated for the second emitter-detector pair;
triangulating the proximity data from the first and second emitter-detector pairs to compute a plane that approximates the body surface; and
computing a tilt angle of a plane of the housing with respect to the body surface plane.

14. The method of claim 13, wherein the first emitter emits light having a first wavelength and the second emitter emits light having a second wavelength different from the first wavelength, and acquiring proximity data from the first emitter-detector pair and acquiring data from the second emitter-detector pair occur concurrently.

15. The method of claim 14, wherein the first emitter emits green light and the second emitter emits infrared light.

16. The method of claim 14, wherein the first and second emitters emit the same wavelength light, and acquiring proximity data from the first emitter-detector pair and acquiring data from the second emitter-detector pair occur sequentially.

17. The method of claim 13, further comprising:
acquiring proximity data from a third emitter-detector pair, the third emitter-detector comprising:
the first emitter and a second detector, wherein acquiring proximity data comprises activating the first light source, measuring light data from the second light detector, and mapping the measured light data to a third separation distance (z distance) using proximity curve data generated for the third emitter-detector pair.

18. The method of claim 13, further comprising:
re-assigning each of the first emitter, the second emitter, the first light detector, and the second light detector to another emitter-detector pair; and
acquiring proximity data from each another emitter-detector pair.

19. The method of claim 13, further comprising:
comparing the first and second separation distances to a threshold value; and
determining the device is located off-wrist when the first and second separation distances are above the threshold value.

20. The method of claim 13, further comprising:
comparing the first separation distance to a first threshold value;
comparing the second separation distance to a second threshold value; and
determining the device is located off-wrist when the first separation distance is below the first threshold value and the second separation distance is above the second threshold value.

* * * * *